US006655824B2

(12) United States Patent
Tufte

(10) Patent No.: US 6,655,824 B2
(45) Date of Patent: Dec. 2, 2003

(54) LIGHTING APPARATUS

(76) Inventor: Brian N. Tufte, 17488 Wexford Dr., Eden Prairie, MN (US) 55347

( * ) Notice: Subject to any disclaimer, the term of this patent is extended or adjusted under 35 U.S.C. 154(b) by 0 days.

(21) Appl. No.: 09/991,078

(22) Filed: Nov. 16, 2001

(65) Prior Publication Data

US 2002/0030997 A1 Mar. 14, 2002

Related U.S. Application Data

(63) Continuation-in-part of application No. 09/372,643, filed on Aug. 11, 1999.

(51) Int. Cl.[7] .......... B60Q 1/32

(52) U.S. Cl. .......... 362/505; 362/369; 293/117; 114/219

(58) Field of Search .......... 362/505, 369, 362/376, 260, 84; 207/139, 140; 293/117, 120; 114/219

(56) References Cited

U.S. PATENT DOCUMENTS

| | | | | | |
|---|---|---|---|---|---|
| 1,647,014 | A | * | 10/1927 | Pattison | 293/117 |
| 1,729,274 | A | * | 9/1929 | Millar | 116/28 R |
| 1,972,283 | A | * | 9/1934 | Zimmers | 190/25 |
| 2,525,001 | A | * | 10/1950 | Sherwood | 362/806 |
| 2,587,807 | A | | 3/1952 | Arenberg et al. | |
| 2,959,146 | A | * | 11/1960 | Erkert | 114/219 |
| 3,140,111 | A | * | 7/1964 | Dabroski | 114/219 |
| 3,196,265 | A | | 7/1965 | Schneider | 362/505 |
| 3,197,189 | A | * | 7/1965 | Pemper et al. | 114/219 |
| 3,317,722 | A | | 5/1967 | Whitney | 313/512 |
| 3,359,030 | A | * | 12/1967 | Newman | 114/219 |
| 3,473,836 | A | * | 10/1969 | Halter | 114/219 |
| 3,639,748 | A | * | 2/1972 | Pearson et al. | 293/117 |
| 3,865,358 | A | * | 2/1975 | Butters | 267/140 |
| 4,107,767 | A | | 8/1978 | Anquetin | 362/236 |
| 4,213,644 | A | | 7/1980 | Scrivo et al. | 362/505 |
| 4,270,787 | A | * | 6/1981 | Savell | 293/121 |
| 4,376,966 | A | | 3/1983 | Tieszen | 362/249 |
| 4,947,293 | A | | 8/1990 | Johnson et al. | |
| 4,996,634 | A | * | 2/1991 | Haneda et al. | 293/117 |
| 5,096,753 | A | * | 3/1992 | McCue et al. | 24/293 |
| 5,434,013 | A | | 7/1995 | Fernandez | 428/690 |
| 5,499,170 | A | | 3/1996 | Gagne | |
| 5,523,923 | A | | 6/1996 | Stowe, Jr. | |
| 5,613,750 | A | * | 3/1997 | Roe | 362/223 |
| 5,678,914 | A | | 10/1997 | Dealey et al. | |
| 5,711,592 | A | | 1/1998 | Hotta | |
| 5,775,016 | A | | 7/1998 | Chien | |
| 6,019,476 | A | * | 2/2000 | Kirschner | 362/147 |
| 6,050,211 | A | * | 4/2000 | Yamaguchi | 114/219 |
| 6,113,246 | A | | 9/2000 | Rub | 363/223 |
| 6,120,160 | A | * | 9/2000 | Nakagawa | 362/260 |
| 6,152,586 | A | | 11/2000 | Dealey et al. | |
| 6,231,217 | B1 | | 5/2001 | Krippelz, Sr. | |
| 6,364,293 | B1 | * | 4/2002 | Beckett | 267/140 |
| 6,450,678 | B1 | | 9/2002 | Bayersdorfer | |
| 6,461,028 | B1 | | 10/2002 | Huang | 362/505 |

* cited by examiner

*Primary Examiner*—Alan Cariaso
*Assistant Examiner*—Ismael Negron
(74) *Attorney, Agent, or Firm*—Brian N. Tufta

(57) ABSTRACT

A lighting apparatus for illuminating of objects or equipment including, for example, vehicles, retail and/or store shelving and/or equipment, bars, desks, counters, walls, railings, steps, and/or any other object or surface, as desired. In some embodiments, the lighting apparatus includes a bumper to help provide a level of protection to the objects and/or surfaces that are subject to bumping, sliding or other abuse.

31 Claims, 22 Drawing Sheets

600
602
604
606
612
608

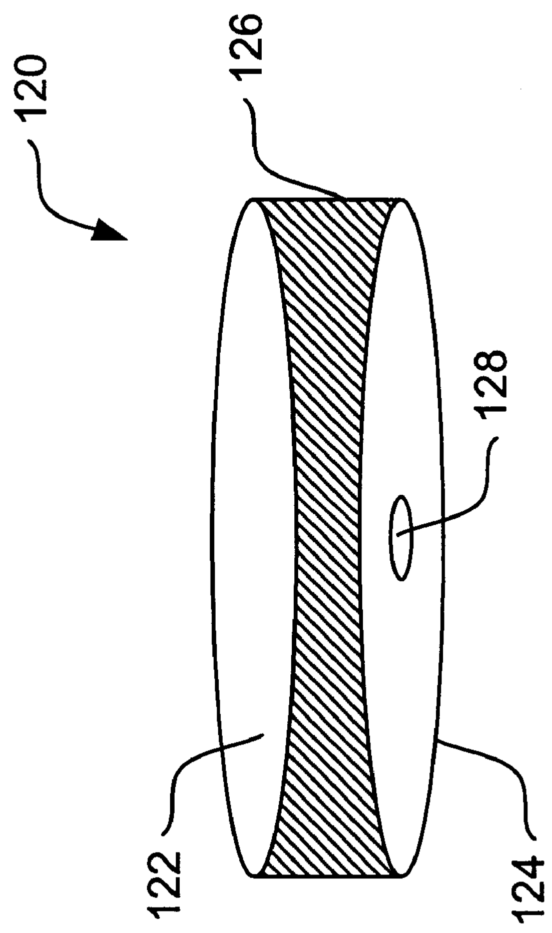
FIG. 8
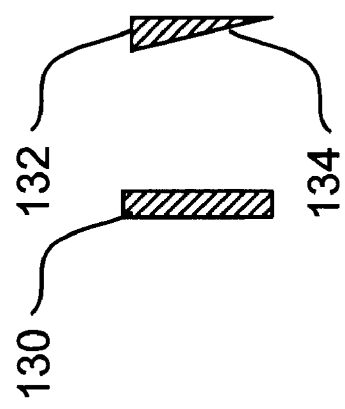

LIGHTING APPARATUS

This application is a continuation-in-part of co-pending U.S. patent application Ser. No. 09/372,643, which was filed on Aug. 11, 1999, and which is incorporated herein by reference.

BACKGROUND OF THE INVENTION

This invention relates to lights, and more particularly, to lights for illuminating and/or protecting an object or surface.

SUMMARY OF THE INVENTION

The present invention provides a lighting apparatus that may be used to illuminate an object or surface. In one illustrative embodiment, the light apparatus is used to help improve the visibility of a vehicle by illuminating one or more side surfaces of the vehicle. The side surfaces of many vehicles provide a relatively large area that, when illuminated, can significantly increase the visibility of the vehicle, especially at night. It is believed that by providing such visibility, vehicle safety can be significantly improved.

In other illustrative embodiments, the light apparatus may be used to illuminate other objects or equipment including, for example, retail and/or store shelving and/or equipment, bars, desks, counters, walls, railings, steps, and/or any other object or surface, as desired. In some embodiments, the lighting apparatus includes a bumper. When so provided, the lighting apparatus may help provide a level of protection to objects and/or surfaces that are subject to bumping, sliding or other abuse.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 8 is a perspective view of another illustrative boat lighting apparatus in accordance with the present invention;

DETAILED DESCRIPTION OF THE PREFERRED EMBODIMENTS

Figure 1:
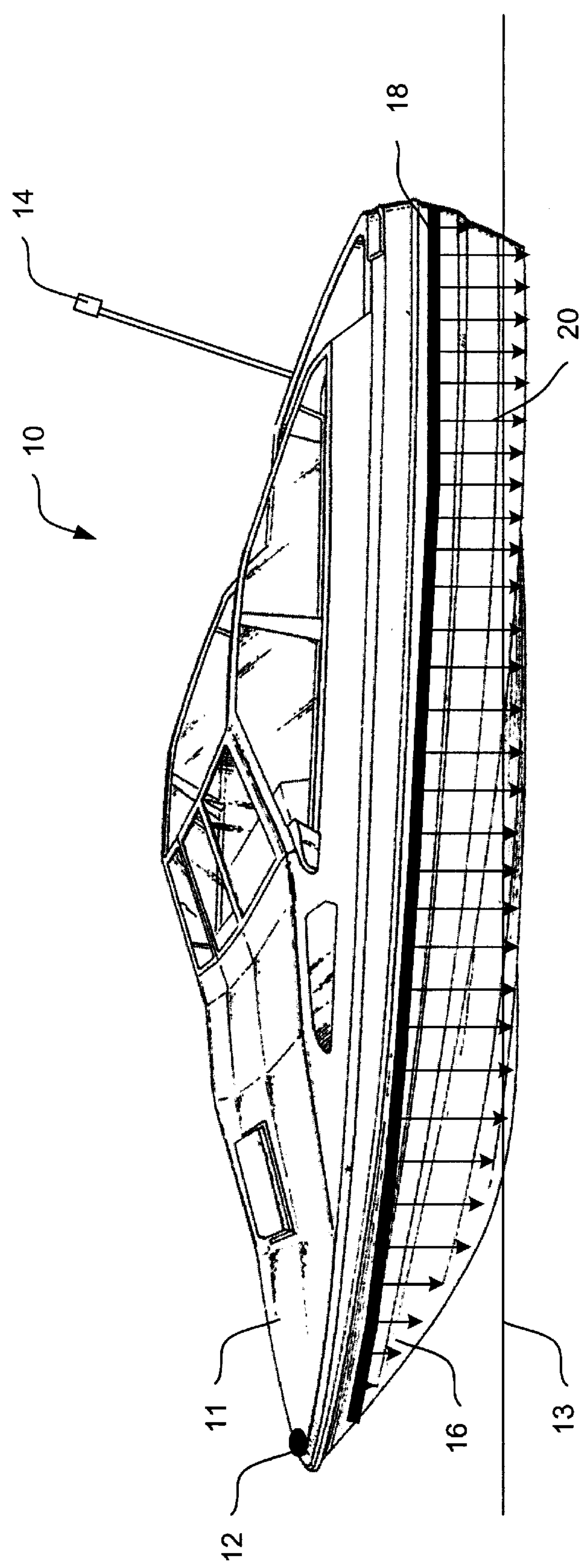
FIG. 1 is a perspective view of a boat having a first illustrative boat lighting apparatus.

FIG. 1 is a perspective view of a boat 10 having a first illustrative boat lighting apparatus in accordance with the present invention. The boat is generally shown at 10, and includes an upper deck 11 extending over a hull 16. The hull 16 extends generally down from the upper deck 11 toward an expected water line 13. The hull 16 may also extend generally inward, as shown.

Prior art navigation lights typically include forward running lights 12 and a rear masthead light 14. The forward running lights 12 typically include a red port light and a green starboard light. In many cases, the forward running lights 12 are provided in a relatively small housing mounted to the front of the boat. The rear masthead light 14 is shown mounted higher than the forward running lights 12, and is visible from the front of the boat.

This lighting configuration may be adequate for experienced boaters traveling in relatively low traffic waterways under good weather conditions. However, under other conditions, they are less desirable. Many of today's waterways are extremely crowded, often occupied with high powered boats driven by inexperienced and inattentive boaters. Safely operating a boat at night under these conditions can be a challenge. Depth perception is limited, and lights along the shoreline can cast misleading reflections on the water. In many instances, simply identifying boats via the forward running lights 12 and the masthead light 14 can be difficult, let along determining the size, direction, speed, and other factors needed to safely travel the waterways.

To augment the basic running lights 12 and 14 shown in FIG. 1, the present invention contemplates providing a boat lighting apparatus that improves the visibility of a boat by illuminating one or more side surfaces of the hull 16 of the boat 10. The hull 16 of the boat provides a relatively large area that, when illuminated, can significantly increase the visibility of a boat 10. In addition, the size, direction, and speed of a boat 10 can more readily be determined, even by novice or inattentive boaters. It is believed that by providing such visibility, boat safety can be significantly improved.

In the illustrative embodiment shown in FIG. 1, a boat lighting apparatus 18 is provided along the length of the hull 16 of the boat 10. The boat lighting apparatus 18 includes one or more light sources for producing light rays 20. The boat lighting apparatus 18 may be mounted to the boat and configured such that at least a portion of the light rays 20 illuminate a portion of the hull 16. In the embodiment shown, the boat lighting apparatus 18 provides light rays 20 that illuminate a substantial portion of the outer surface of the hull 16. Although not shown, the boat lighting apparatus 18 may continue around the perimeter of the boat hull 16, and illuminate both side surfaces of the hull and the back surface of the hull. The boat lighting apparatus 18 may provide a different color light for each side of the boat, such as a red light on the port side, a green light on the starboard side and a while light on the back side.

It is contemplated that the boat lighting apparatus 18 may or may not include a redirector (see below) for redirecting at least a portion of the light rays 20 to the side surface of the hull 16. The redirector may also prevent at least a portion of the light rays from traveling horizontally away and/or upward from the hull 16 of the boat 10.

A method of the present invention includes the steps of providing one or more light sources, and mounting the one or more light sources to the boat such that when energized, the one or more light sources illuminate a side surface of the hull 16.

Figure 2:
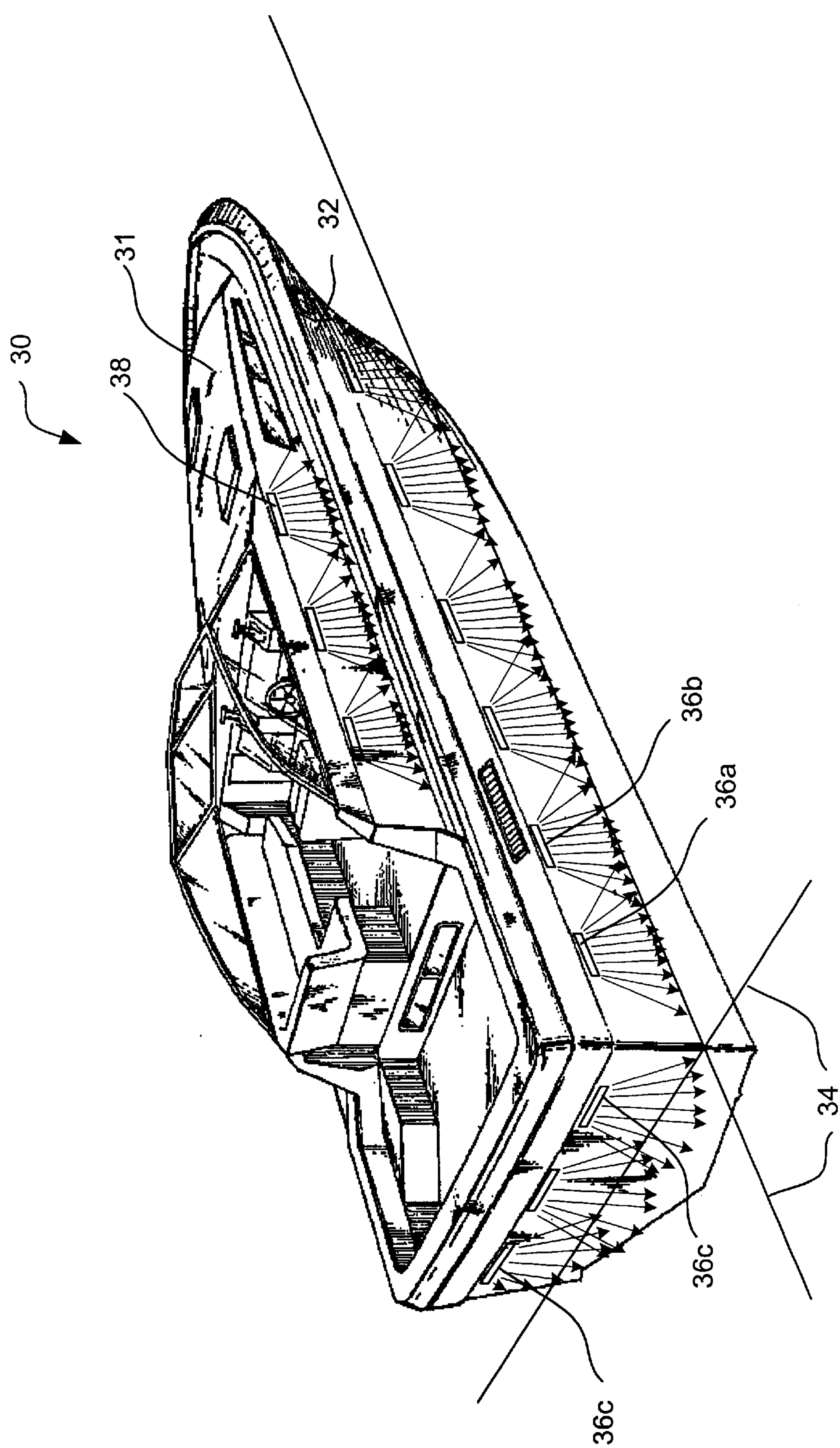
FIG. 2 is a perspective view of a boat having another illustrative boat lighting apparatus.

FIG. 2 is a perspective view of a boat having another illustrative boat lighting apparatus. The boat is generally shown at 30, and includes an upper deck 31 extending over a hull 32. The hull 32 extends generally down from the upper deck 31 toward an expected water line 34. The hull 32 may also extends generally inward, as shown. In this embodiment, a number of boat lights 36*a*, 36*b*, 36*c* and 36*d* are mounted to the hull 32 of the boat 30. Boat lights 36*a* and 36*b* are mounted to the starboard side of the hull 32, and boat lights 36*c* and 36*d* are mounted to the back of the hull 32.

Figure 3:
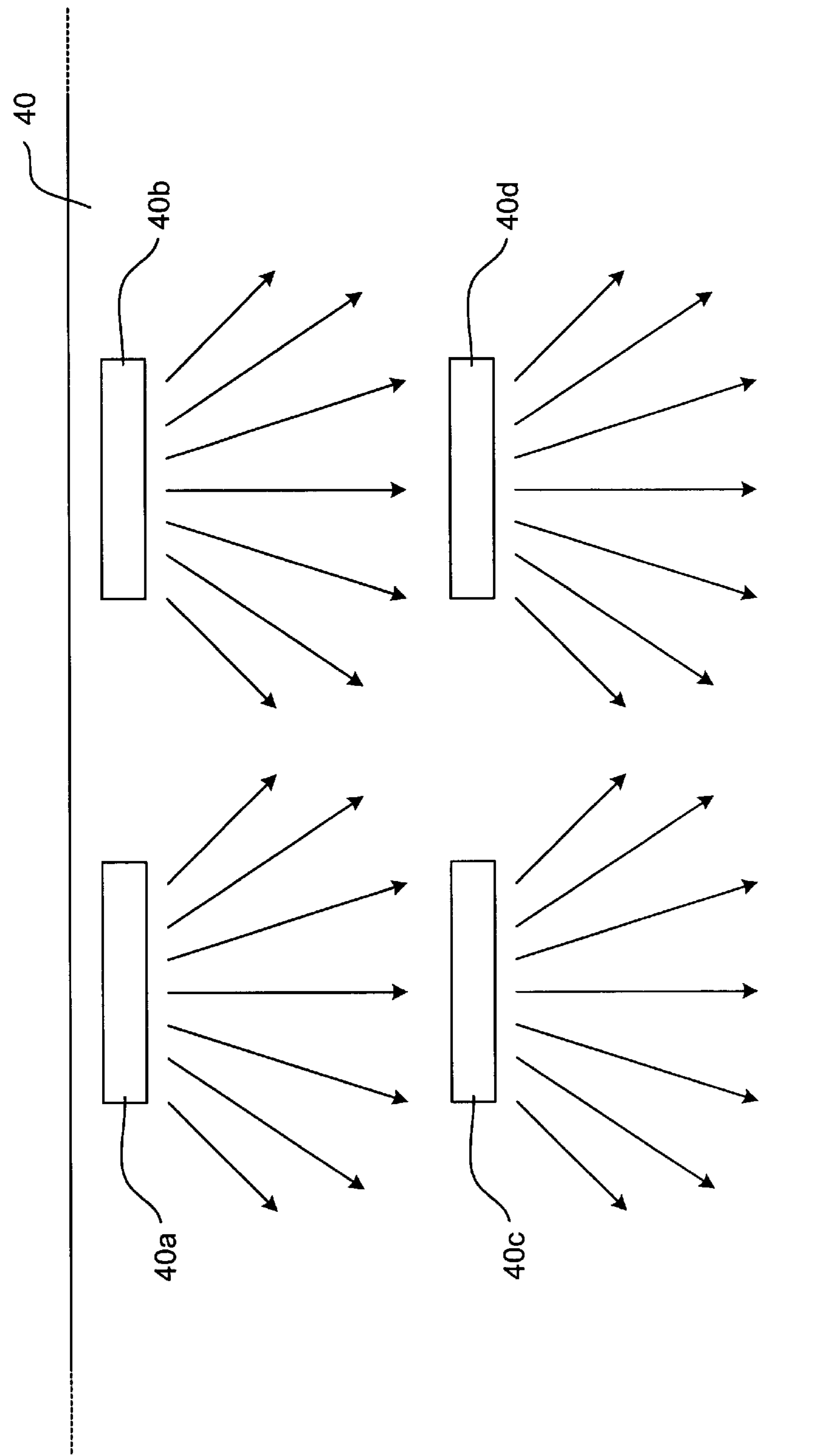
FIG. 3 is a schematic view of a boat hull having a number of boat lights, each directing light rays in a downward direction.
Figure 4:
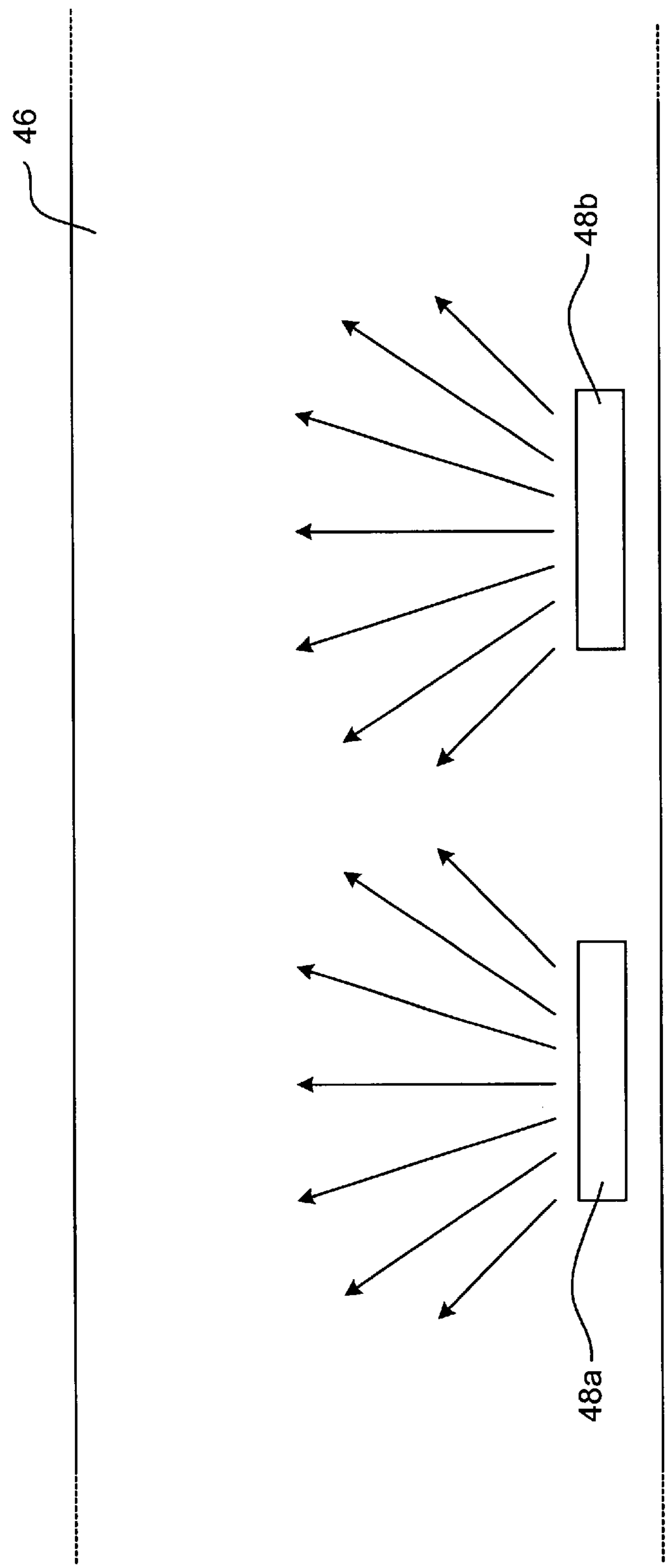
FIG. 4 is a schematic view of a boat hull having a number of boat lights, each directing light rays in an upward direction.
Figure 5:
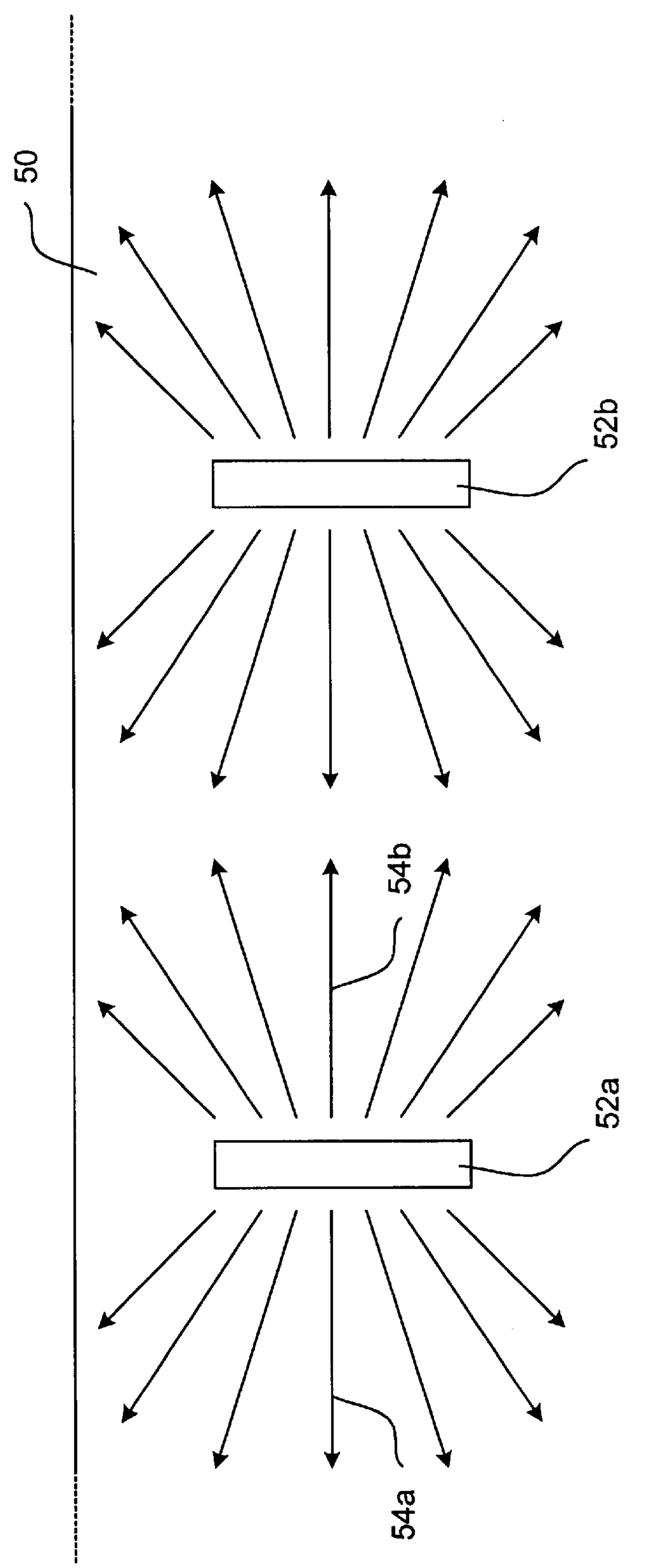
FIG. 5 is a schematic view of a boat hull having a number of boat lights, each directing light rays in forward and backward direction.

In the illustrative embodiment, each of the boat lights 36*a*, 36*b*, 36*c* and 36*d* includes at least one light source for producing a number of light rays and an elongated carrier for carrying the at least one light sources. The elongated carrier is preferably adapted for directing the light rays down to the boat hull 32 along a longitudinally extending axis, wherein the longitudinally extending axis has a length that is substantially longer than the width of the carrier, as shown. FIGS. 3–5 below show a number of illustrative placements for the lights of, for example, FIGS. 2, 6–12, and 18–31.

It is also contemplated that when the upper deck 31 includes one or more relatively vertically extending surfaces, additional boat lights 38 may be provided to illuminate these side surfaces as well. This may even further increase the visibility of the boat 30.

FIG. 3 is a schematic view of a boat hull having a number of boat lights, each directing light rays in a downward direction. While rectangular shaped boat lights are shown, it is contemplated that the boat lights may assume any desired shape. A hull is illustrated at 40 with a number of boat lights 40*a*, 40*b*, 40*c* and 40*d* mounted thereto. Boat lights 40*a* and 40*b* are shown mounted near the top of hull 40 and provide light rays in a generally downward direction. Boat lights 40*c* and 40*d* are shown mounted in an intermediate location on hull 40, and also provide light rays in a generally downward direction.

It is recognized that only the upper row of boat lights 40*a* and 40*b* may be necessary to illuminate the boat hull 40 down to the expected water line. Some hull designs may curve significantly inward toward the expected water line. For these boat hulls, it has been found that water at the water line of the boat may reflect some of the light provided by the upper row of boat lights 40*a* and 40*b* toward the hull of the boat. In some embodiments, one or more lower rows of boat lights, such as boat lights 40*c* and 40*d*, may be provided to help illuminate the lower portion of the boat hull 40, if desired.

FIG. 4 is a schematic view of a boat hull having a number of boat lights, each directing light rays in an upward direction. A hull is illustrated at 46 with a number of boat lights 48*a* and 48*b* mounted thereto. Boat lights 48*a* and 48*b* are shown mounted on a lower portion of hull 46, and provide light rays in a generally upward direction.

FIG. 5 is a schematic view of a boat hull having a number of boat lights, each directing light rays in forward and backward direction. A hull is illustrated at 50 with a number of boat lights 52*a* and 52*b* mounted thereto. Boat lights 52*a* and 52*b* are shown mounted on the hull 50, and may provide light rays in either a forward direction, a backward direction, or both. For example, boat light 52*a* may provide light rays 54*a* in a generally backward direction, light rays 54*b* in a generally forward direction, or both.

Figure 6:
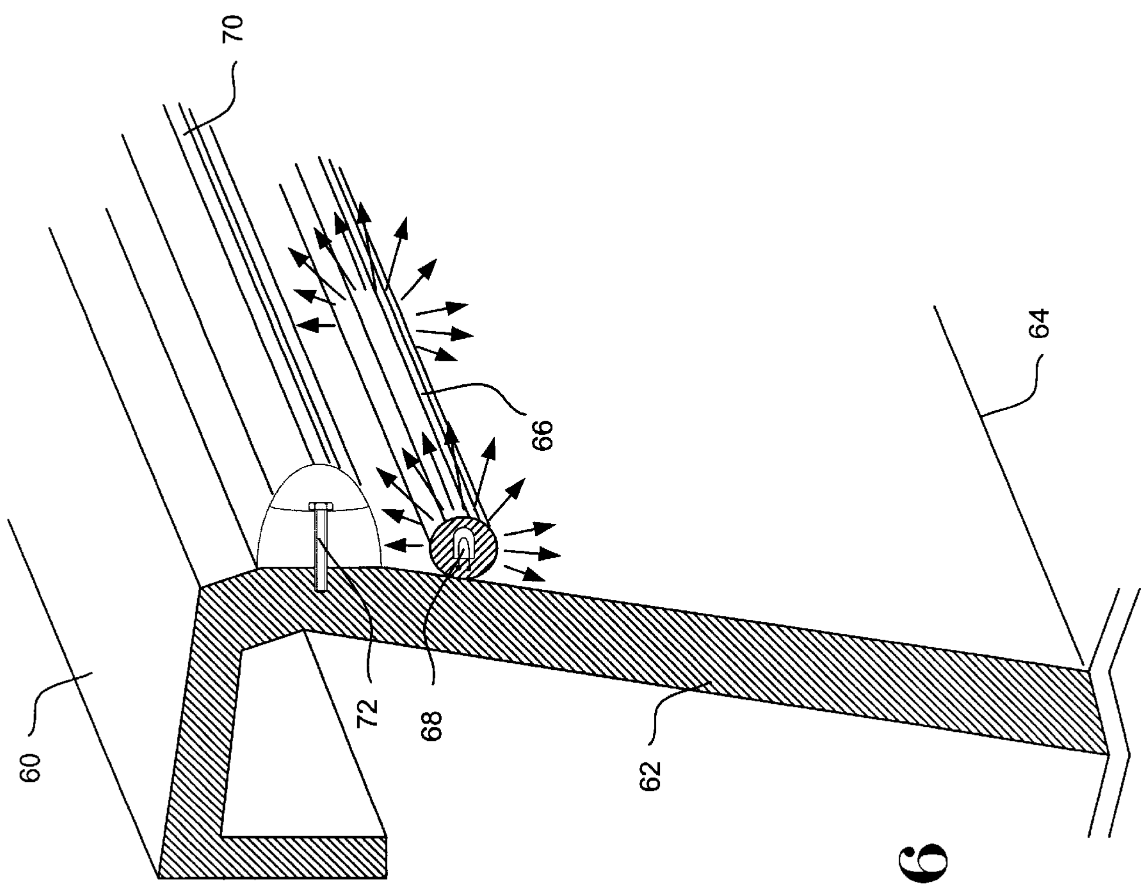
FIG. 6 is a partial cross-sectional perspective view of a boat hull having an illustrative elongated light apparatus.

FIG. 6 is a partial cross-sectional perspective view of a boat hull 60 having an illustrative elongated boat lighting apparatus 66. The boat hull 60 includes a generally downward extending portion 62 that extends to an expected water line 64. The boat hull 60 may also include a bumper assembly 70 for protecting the boat hull 60 from docks or the like. The bumper assembly 70 is shown mounted on a top portion of the downward extending portion 62 of the boat hull 60 via mounting bolt 72.

The elongated boat lighting apparatus 66 is shown mounted to the downward extending portion 62 just below the bumper assembly 70. The elongated boat lighting apparatus 66 includes at least one light source for producing a number of light rays as shown, and an elongated carrier for carrying the at least one light source. The elongated carrier is preferably at least partially transparent to allow the light rays produced by the one or more light source to exit the carrier. In the embodiment shown, the light rays exit the carrier in various directions including down to the downward extending portion 62 of the boat hull 60, horizontally away from the boat hull 60, and upward toward the bumper assembly 70. However, in some embodiments, a redirector (not shown) may be positioned adjacent the top and outer side of the carrier to redirect substantially all of the light rays to the downward extending portion 62 of the boat hull 60. The redirector may include, for example, a separate shield placed around the top and outer side of the carrier, a reflective coating positioned on the top and outer side surface of the carrier, or portions of the carrier may be made non-transparent. Alternatively, or in addition, the elongated boat lighting apparatus 66 may be incorporated into the bumper assembly 70, similar to that shown in FIG. 9.

It is contemplated that the one or more light sources 88 (as well as the other light sources referenced throughout the drawings) may be any type of light source including an incandescent light source, a fluorescent light source, a light emitting diode (LED), any type of laser including one or more vertical cavity surface emitting lasers (VCSEL), a phosphor material, a glow in the dark material, or any other type of light source, either active or passive, that is capable of producing visible light.

In some embodiments, the one or more light sources may include an elongated light source, such as an electroluminescent wire. One such electroluminescent wire is commercially available from Solution Industries, located in Cypress, Tex., under the Trademark Flex Wire®. Alternatively, or in addition, the one or more light sources may be a string of light sources, such as a string of incandescent light sources. One such string of light sources is available from Light Tech, Inc., located in Grand Rapids, Mich.

It is also contemplated the one or more light sources may include a light guide, such as a solid or multi-strand fiber optic cable or any other type of light transmitting medium that can transmit light rays. When so provided, the actual source of light may be located remotely, if desired, and coupled to the fiber optic cable or other type of light transmitting medium that can deliver the light rays to the desired location. One particularly suitable fiber optic cable is a linear emitting fiber, which emits light out of the side of the fiber. One such linear emitting fiber is available from Lumenyte International Corporation, Irvine, Calif., under the Trademark STA-FLEX® LEF™ Linear Emitting Fiber. More information on Linear Emitting Fibers can be found in, for example, U.S. Pat. Nos. 6,289,150, 6,282,355, 6,251,311, 5,987,199, 5,937,127, 5,903,695, RE36,157, all of which are incorporated herein by reference. Traditional fiber optical cable may also be used, if desired.

It is contemplated that in some embodiments, the light source may include a UV stabilizer, UV absorber and/or UV filter. For example, some commercially available electroluminescent wires include a polymer coating or sleeve over the electroluminescent material. It is contemplated that the polymer coating or sleeve may include a UV stabilizer, UV absorber and/or UV filter to help limit the deterioration of the polymer coating and/or electroluminescent material. A preferred UV absorber is Sanduvor PR-25, available from Clariant Corp., Charlotte, N.C., which operates using photoreactive chemistry. However, other UV stabilizers, UV absorbers, and UV filters may be used, as desired.

Figure 7:
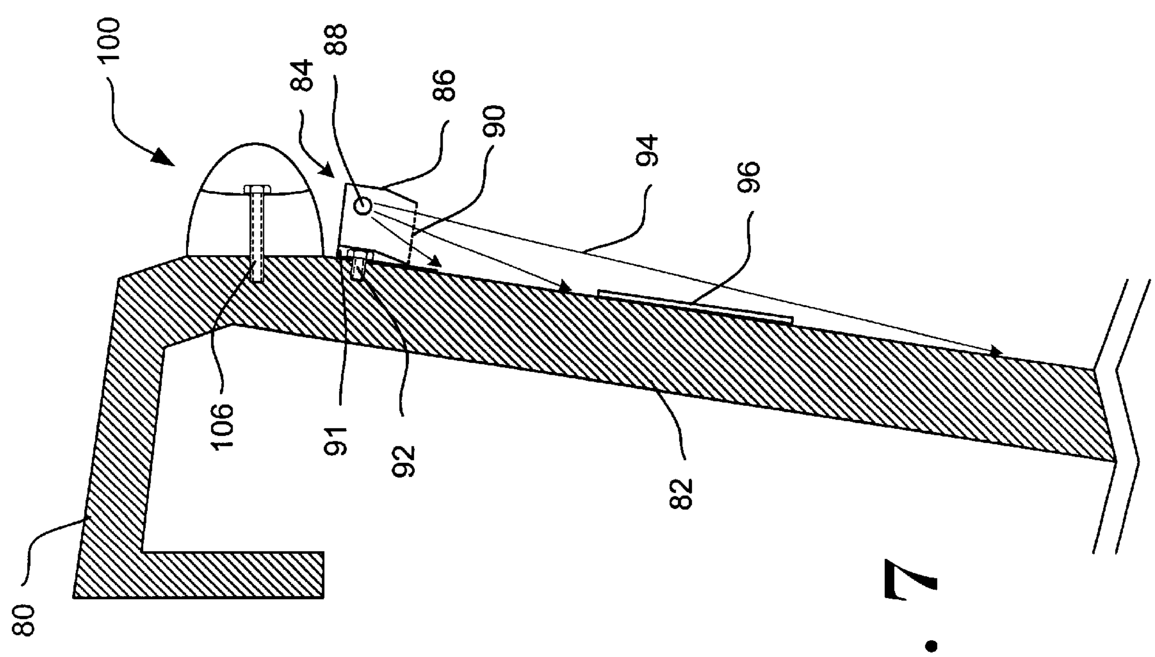
FIG. 7 is a partial cross-sectional side view of a boat hull having another illustrative boat lighting apparatus.

FIG. 7 is a partial cross-sectional side view of a boat hull having another illustrative boat lighting apparatus. The boat hull 80 includes a generally downward extending portion 82 that extends to an expected water line. The boat hull 80 may also include a bumper assembly 100 for protecting the boat hull 80 from docks or the like. The bumper assembly 80 is shown mounted on a top portion of the downward extending portion 82 of the boat hull 80 via mounting bolt 106.

In the illustrative embodiment, boat lighting apparatus 84 is mounted to the downward extending portion 82, just below the bumper assembly 100. The boat lighting apparatus 84 includes one or more light sources 88 for providing light rays, a housing 86 for carrying the light source 88, and a mount 91 for mounting the housing 86 to the boat. The mount 91 is shown bolted to the side of the downward extending portion 82 of the hull via a bolt or screw 92. It is contemplated, however, that any number of means may be used to attach the mount to the boat including an adhesive or the like.

The housing 86 preferably has at least one opening 90 for directing the light rays 94 to at least a portion of the hull of the boat. In the illustrative embodiment shown, the housing 86 includes a wall that extends around three sides of the light source 88, leaving the one opening 90 on the fourth downward side. Such a configuration not only helps direct the light rays 94 toward the hull of the boat, but also helps prevent at least a portion of the light rays from traveling laterally away from the hull of the boat. The inside surface of the housing 86 may be reflective, and may be shaped to help redirect the light rays 94 in a downward direction toward the hull of the boat. The housing 86 may also include a bracket (not shown) for carrying the one or more light sources 88.

A transparent or semi-transparent plate may be positioned across the opening 90. The transparent or semi-transparent plate may be constructed as a lens or the like to help redirect and/or focus the light on the hull of the boat. It is also contemplated that the transparent or semi-transparent plate may include a pattern provided thereon or therein to cause an image to be projected onto the hull of the boat. Finally, the transparent or semi-transparent plate may help protect the one or more light sources 88 from water or other undesirable environmental conditions.

In some embodiments, the transparent or semi-transparent plate may include a UV stabilizer, UV absorber and/or UV filter. The remainder of the housing 86 may also include a UV stabilizer, UV absorber and/or UV filter. This may help prevent deterioration of the transparent or semi-transparent plate and/or housing 86, and may limit the amount of TV radiation that engages the one or more light sources. This may help extend the life of the light assembly, especially when exposed to sun light. It is contemplated that UV stabilizers, UV absorbers and/or UV filters may be applied to the carriers, housings, light sources, and other parts of the various embodiments disclosed herein, as desired.

To enhance the illumination of the hull of the boat, it is contemplated that a reflective medium 96 may be provided in or on the outer surface of the boat as shown. The reflective medium preferably helps reflect the light rays 94 laterally outward and away from the hull of the boat to enhance the visibility of the boat. It is contemplated that the reflective medium may be patterned to form an image. The image may be, for example, the name of the boat, advertising logos or any other desired image.

FIG. 8 is a perspective view of another illustrative boat lighting apparatus in accordance with the present invention. This illustrative boat lighting apparatus includes a round housing 120 that has an outer plate 122 and an inner plate 124. The inner plate 124 is preferably positioned adjacent the boat hull when installed, and includes a hole 128 for receiving wires or the like to power a local light source. While a round housing is shown, it is contemplated that the housing 120 may be any shape.

A side plate 126 extends around part of the perimeter of the outer plate 122 and the inner plate 124. In the embodiment shown, the side plate 126 extends around the perimeter of about the upper half of the outer plate 122 and inner plate 124, leaving the perimeter around the lower half open. A light source (not shown) is preferably provided in the space between the outer plate 122 and the inner plate 124. In this configuration, the outer plate 122, inner plate 124 and side plate 126 help redirect the light rays provided by the light source downward through the opening toward the hull of the boat.

A transparent or semi-transparent plate 130 may extends around the lower perimeter of the outer plate 122 and the inner plate 124. The transparent or semi-transparent plate 130 helps protect the light source from water and other undesirable environmental conditions. It is contemplated that the transparent or semi-transparent plate may be configured as a lens or the like to help focus or redirect the light rays to the hull of the boat. One such transparent or semi-transparent plate is illustrated at 132, and has an outer surface 134 that tapers inward toward the boat. Because the lens is thicker away from the boat, the light rays traveling parallel to the hull of the boat are refracted more than those light rays that are already traveling toward the hull of the boat. This may help increase the illumination of the hull of the boat.

Figure 9:
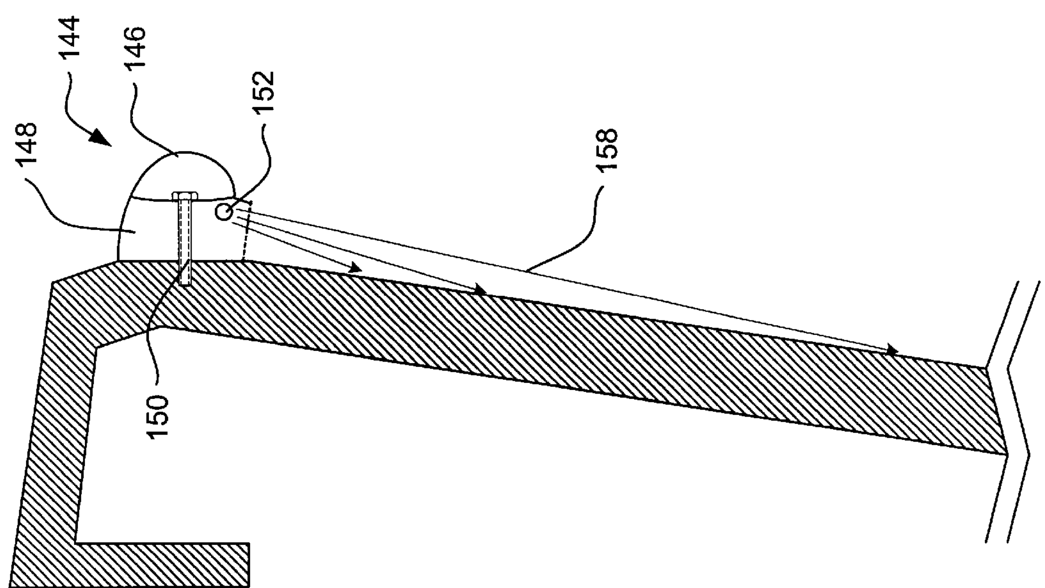
FIG. 9 is a partial cross-sectional side view of a boat hull having a boat lighting apparatus incorporated into a side bumper assembly.

FIG. 9 is a partial cross-sectional side view of a boat hull with yet another boat lighting apparatus. This embodiment is similar to that shown in FIG. 7, but has the boat lighting apparatus integrated or incorporated into the bumper assembly 144. The bumper assembly 144 includes a flexible bumper guard 146 attached to an elongated housing 148. The elongated housing 148 is attached to the hull of the boat via a bolt or screw 150. The elongated housing 148 preferably has a cavity therein for receiving one or more light sources 152. The cavity is preferably open along the lower surface thereof to allow the light rays 158 to illuminate the hull of the boat.

Figure 10:
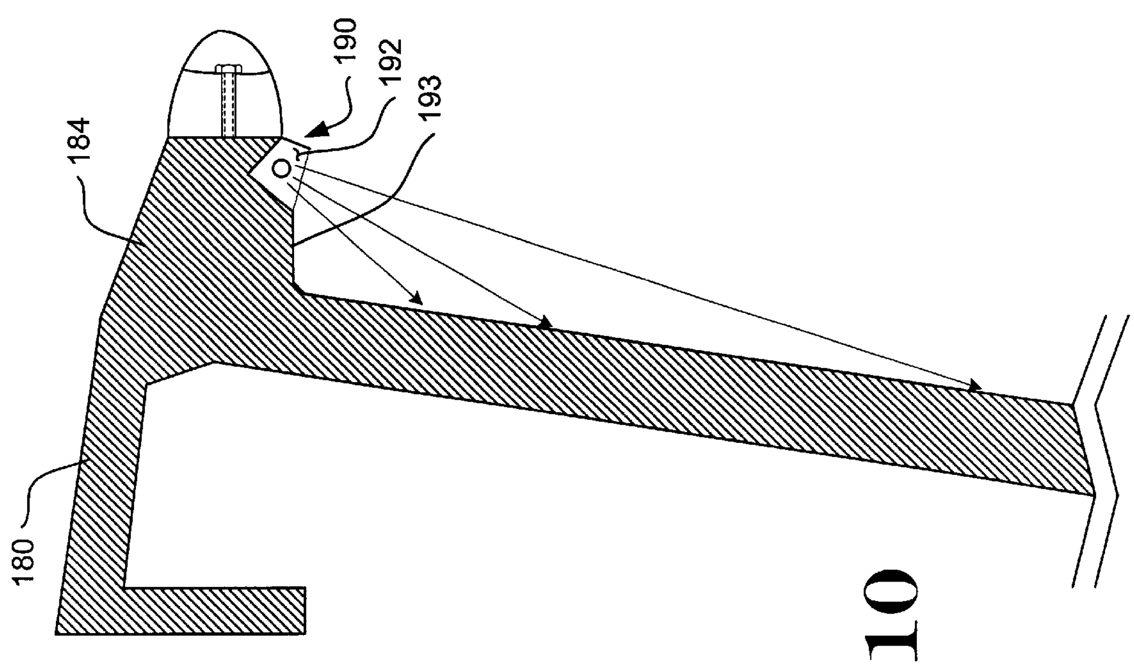
FIG. 10 is a partial cross-sectional side view of a boat hull having a boat lighting apparatus incorporated into an outward extending hull portion.

FIG. 10 is a partial cross-sectional side view of a boat hull having a boat lighting apparatus incorporated into an outward extending hull portion. In this embodiment, the boat hull 180 includes an outward extending hull portion 184. The boat lighting apparatus 190 may then be provided in a cavity 192 provided in the lower surface of the outward extending hull portion 184. Alternatively, a boat lighting apparatus similar to that shown in FIG. 7, for example, may be mounted to a lower surface 193 of the outward extending hull portion 184 to illuminate the hull of the boat.

Figure 11:
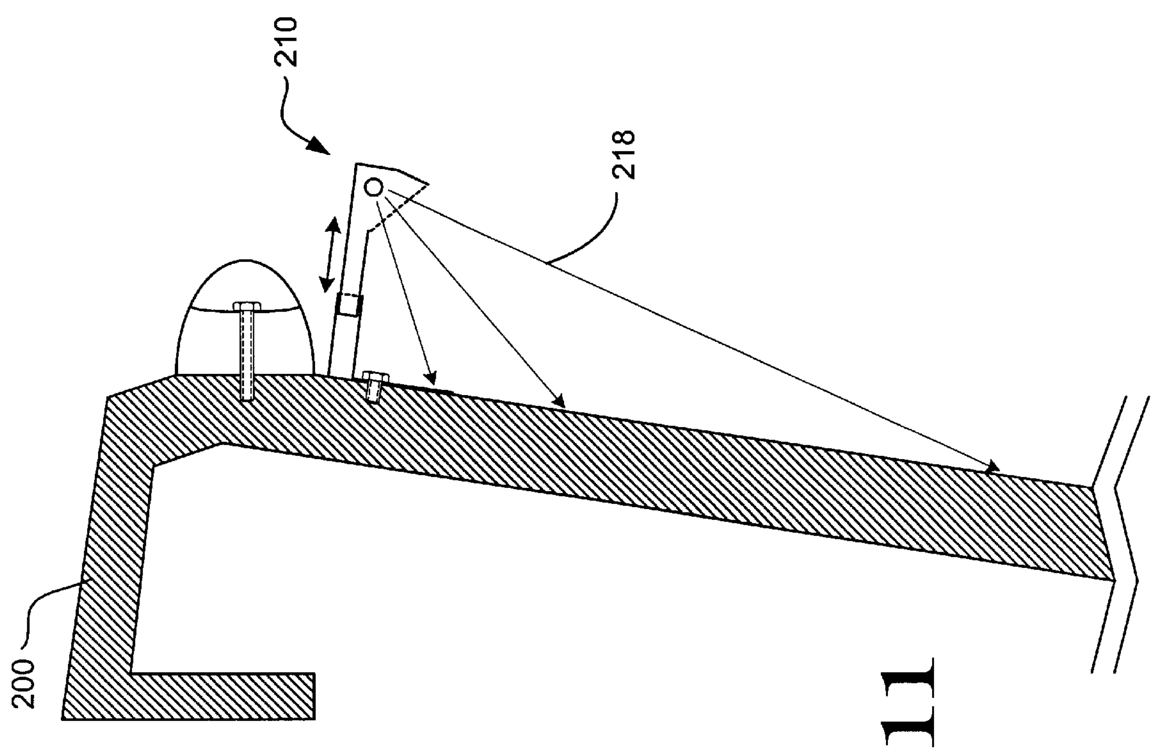
FIG. 11 is a partial cross-sectional side view of a boat hull having a telescoping boat lighting apparatus.

FIG. 11 is a partial cross-sectional side view of a boat hull having a telescoping boat lighting apparatus. In this embodiment, the boat lighting apparatus 210 has a housing that includes a telescoping lever for allowing the light source to be selectively pulled laterally away from the boat. When extended, the light source is further away from the boat hull, thereby increasing the angle of incidence of the light rays 218 at the hull of the boat. By increasing the angle of incidence, the amount of light that is reflected laterally away from the boat may be increased, thereby increasing the visibility of the hull. When contracted, the boat lighting apparatus 210 is preferably safely out of the way to reduce the chance that the boat lighting apparatus 210 will become damaged by other boats, docks or the like.

Figure 12:
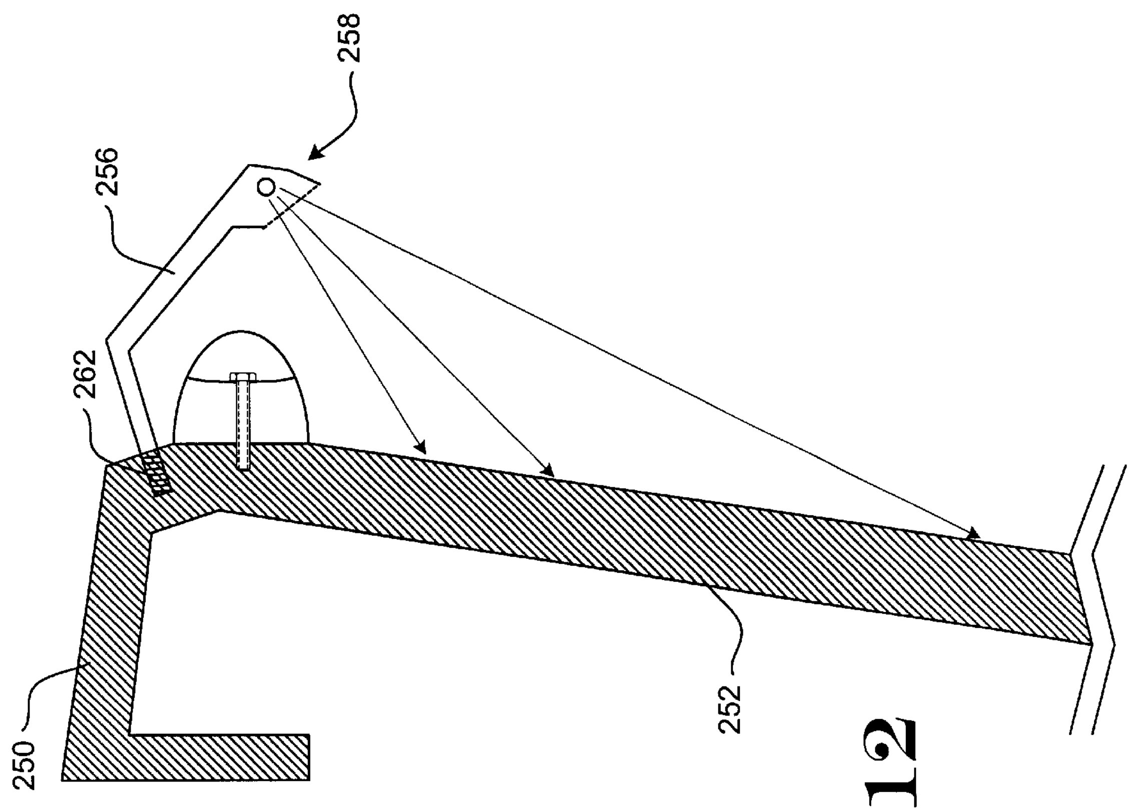
FIG. 12 is a partial cross-sectional side view of a boat hull having a threaded boat lighting apparatus.

FIG. 12 is a partial cross-sectional side view of a boat hull having a threaded boat lighting apparatus. In this embodiment, the boat lighting apparatus 258 includes a threaded end 262. The threaded end 262 preferably is adapted to engage a threaded hole in the hull of the boat. This allows the boat lighting apparatus 258 to be easily removed from the hull of the boat during, for example, daylight hours. In the illustrative embodiment, the boat lighting apparatus 258 is mounted near the top of the hull 250 so that boater inside the boat can easily remove the lights. In this configuration, a laterally extending portion 256 may be provided to extend the light source a sufficient distance away from the boat hull to adequately illuminate the hull of the boat. While the boat lighting apparatus 258 is shown mounted near the top of the hull 250, it is contemplated that the boat lighting apparatus 258 may be mounted anywhere on the boat, including further down on the downward extending portion 252.

Figure 13:
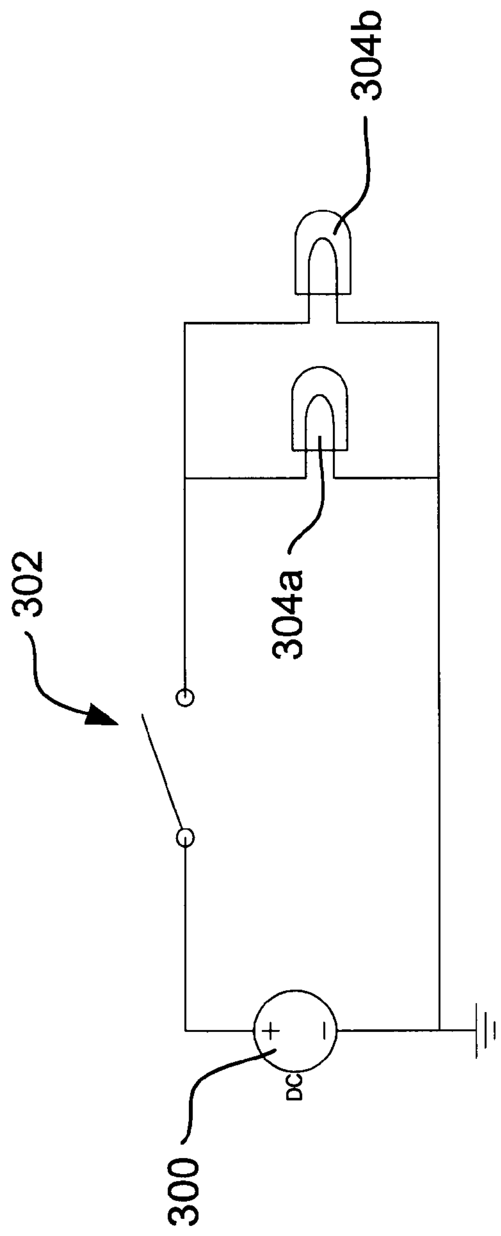
FIG. 13 is a schematic view of an illustrative circuit for powering the one or more light sources of the present invention.

FIG. 13 is a schematic view of an illustrative circuit for powering the one or more light sources of the present invention. In the embodiment shown, a power source 300 is coupled to one or more light sources 304*a* and 304*b* via switch 302. The one or more light sources 304*a* and 304*b* are preferably coupled in a parallel configuration with power source 300, as shown. This allows each light source 304*a* and 304*b* to continue to operate even when one or more of the remaining light sources burns out or otherwise becomes damaged. The power source 300 may be any type of power source, but preferably is the boat battery, the boat alternator, or any other type of power source that is capable of properly driving the one or more light sources 304*a* and 304*b*.

Figure 14:
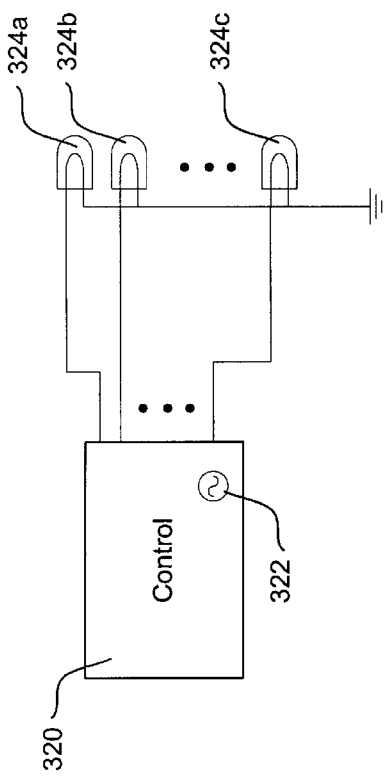
FIG. 14 is a schematic view of another illustrative circuit for powering the one or more light sources of the present invention.

FIG. 14 is a schematic view of another illustrative circuit for powering the one or more light sources of the present invention. In this embodiment, an electronic control circuit 320 provides power to each of a number of light sources 324*a*, 324*b* and 324*c*. The electronic control circuit receives power from a power source 322, and may be any type of control circuit that provides the desired functionality. Preferably, the control circuit is a simple state machine, a microprocessor, or any other type of control circuit.

Figure 15:
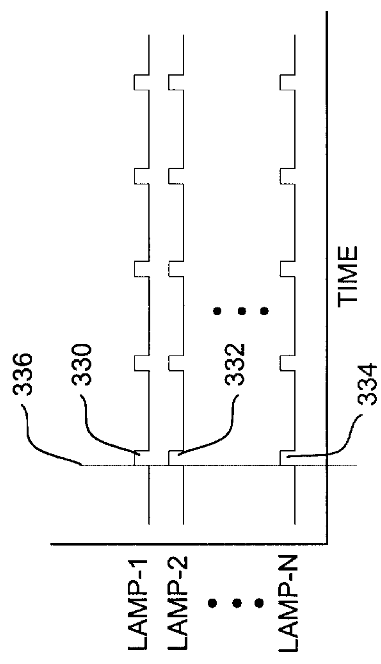
FIG. 15 is a timing diagram showing one illustrative energizing scheme provided by the control block of FIG. 14.

FIG. 15 is a timing diagram showing one illustrative energizing scheme that can be provided by the control circuit 320 of FIG. 14. In this illustrative embodiment, the control circuit 320 simultaneously provides energizing pulses 330, 332 and 334 to light sources 324*a*, 324*b* and 324*c*, respectively, for example at time 336. Each of the energizing pulses 330, 332 and 334 has the same duration. Accordingly, this causes each of the light sources 324*a*, 324*b* and 324*c* to blink "on" during the corresponding energizing pulse, and "off" after the energizing pulse terminates. After a time period, all of the light sources 324*a*, 324*b* and 324*c* are again energized. This causes each of the light sources 324*a*, 324*b* and 324*c* to simultaneously blink "on" and "off". It is believed that a blinking light may increase the visibility of the hull, especially for inattentive boaters.

Figure 16:
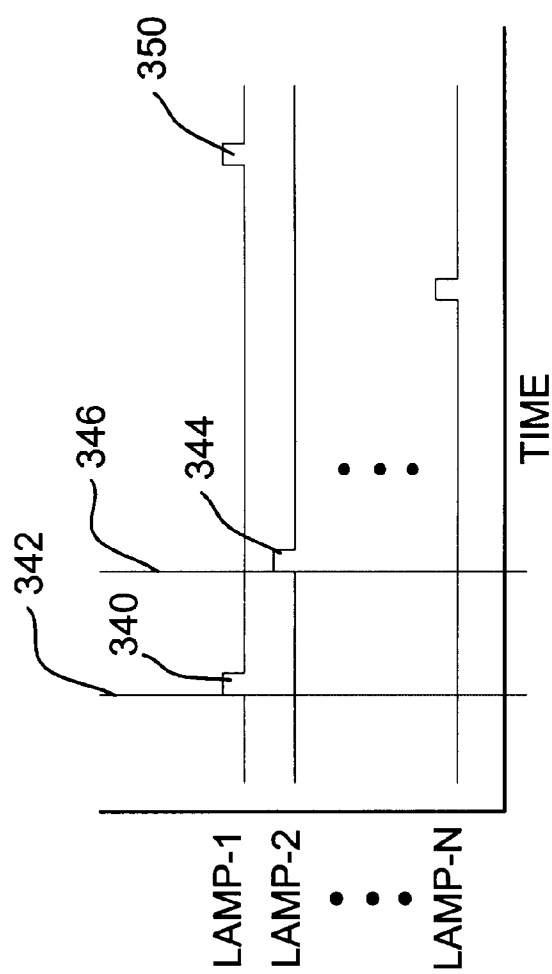
FIG. 16 is a timing diagram showing another illustrative energizing scheme provided by the control block of FIG. 14.

FIG. 16 is a timing diagram showing another illustrative energizing scheme that can be provided by the control circuit 320 of FIG. 14. In this illustrative embodiment, each of the light sources is energized in a sequential manner. For example, light source 324*a* is energized by energizing pulse 340 at time 342. Later, light source 324*b* is energized by energizing pulse 344 at time 346. Finally, light source 324*c* is energized. This sequence may be repeated. In a preferred embodiment, the light sources 324*a*, 324*b* and 324*c* are spaced longitudinally along the length of the boat. By illuminating the light sources in sequence, a moving or sweeping pattern may be generated across the hull of the boat. This may further increase the visibility of the hull of the boat. It is recognized that the embodiments shown in FIGS. 14–16 are only illustrative, and that numerous other lighting sequences can be used.

Figure 17:
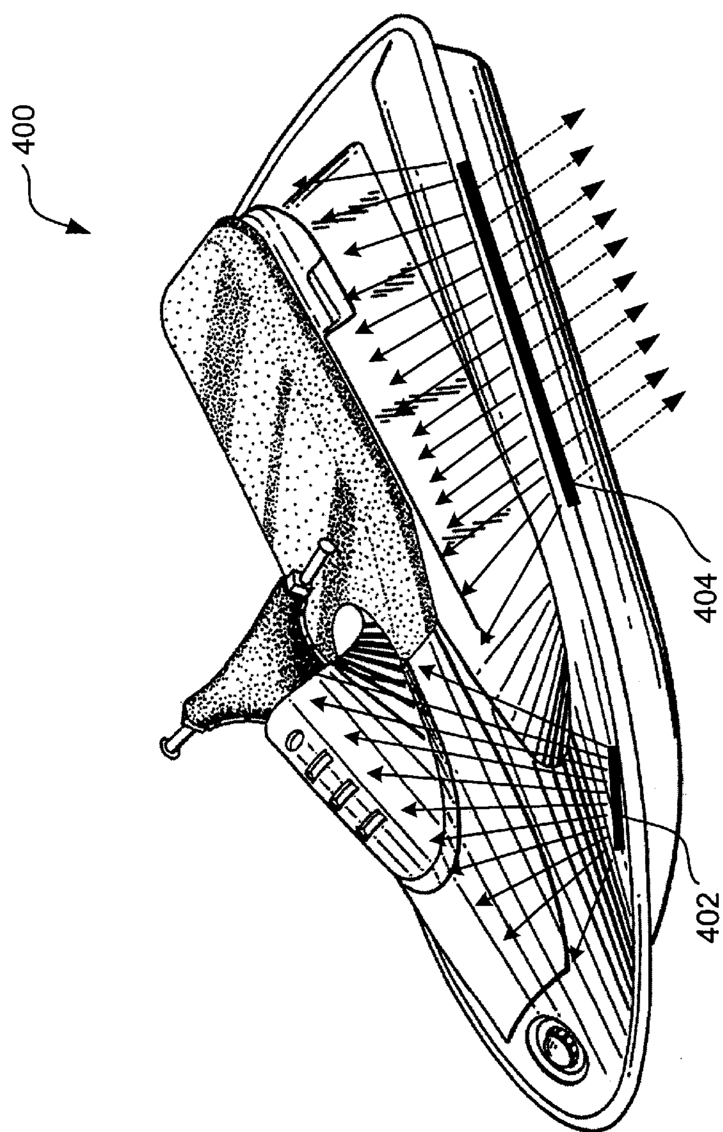
FIG. 17 is a perspective view of a personal watercraft having a boat lighting apparatus mounted thereto.

FIG. 17 is a perspective view of a personal watercraft having one or more boat lights 402 and 404 mounted thereto. Boat lights 402 and 404 are preferably similar to that described herein and preferably illuminate at least a portion of the side surfaces of the personal watercraft. While a personal watercraft is shown in FIG. 17, it is contemplated that the boat lighting apparatus of the present invention may be used to light the side surfaces of airplanes, snowmobiles, automobiles, all terrain vehicles, or any other type of "vehicle" as that term is used in the most general sense, to increase their visibility to outside observers.

Figure 18:
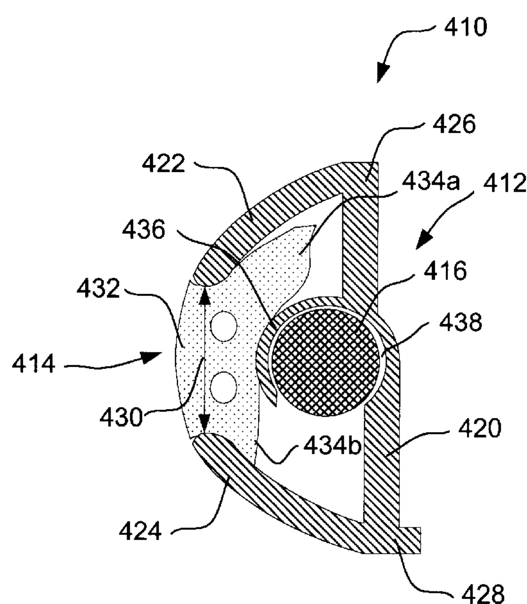
FIG. 18 is a cross-sectional side view of an illustrative lighting apparatus that includes a bumper member.

FIG. 18 is a cross-sectional side view of another illustrative lighting apparatus of the present invention. The illustrative lighting apparatus is generally shown at 410, and includes a carrier 412, a bumper member 414, and a light source 416. The carrier 412 includes a back support 420, a top support 422 and a bottom support 424, as shown. The terms "back", "bottom" and "top" are only used herein as relative terms to help describe the Figures. They are not intended to imply that the bottom support 420 must be below the top support 422 when the carrier 412 is actually mounted to an object. The top support 422 and bottom support 424 are shown extending from the top 426 and bottom 428 ends, respectively, of the back support 420 in a leftward direction. The top support 422 and bottom support 424 terminate to define a gap or slot 430 therebetween.

The bumper member 414 is shown positioned in the gap or slot 430. The bumper member 414 preferably has an outer facing portion 432 that is sized to fit into the slot 430, and one or more inner facing legs 434*a* and 434*b* that extend into the cavity formed by the top support 422 and bottom support 424 of the carrier 412. The one or more legs 434*a* and 434*b* preferably have a dimension that exceeds the lateral dimension of the slot 430, which helps secure the bumper member 414 to the carrier 412. In some embodiments, the bumper member 414 and/or carrier 412 are at least somewhat deformable, so that the bumper member 414 and/or the elongated carrier 412 can or must be elastically deformed to allow the one or more legs 434*a* and 434*b* of the bumper member 414 to slip through the slot 430. The bumper member 414 may also have one or more holes or lumens 440*a* and 440*b*. These holes or lumens 440*a* and 440*b* may decrease the rigidness of the bumper member 414, as desired.

In one illustrative embodiment, the back support 420, top support 422 and bottom support 424 of the carrier 412 are integrally formed by extrusion, although this is not required. In some embodiments, the back support 420, top support 422 and bottom support 424 of the carrier 412 are made from a relatively rigid material, such as Vinyl, PVC, aluminum, or any other suitable material.

The bumper member 414 may also be formed by extruding a material such as Vinyl, PVC, rubber, or any other suitable material. However, like above, this is not required. Preferably, the bumper member 414 is formed from a softer material than the carrier 412, but this is also not required.

In the illustrative embodiment shown in FIG. 18, the carrier 412 has an inner support member 436 that is curved to form a light receiving opening or cavity 438. In the illustrative embodiment, the inner support member 436 is adapted to receive and secure an elongated light source 416. In a preferred embodiment, the elongated light source 416 is an electroluminescent wire or a Linear emitting fiber, as detailed above. However, it is contemplated that the elongated light source 416 may be any type of light source, including those discussed above.

The inner support member 436 may be at least partially transparent or non-transparent. When the inner support member 436 is non-transparent, the light emitted by the light source is directed in a downward direction toward the bottom support 424 of the carrier 412. When so provided, at least a portion of the bottom support 424 is preferably at least partially transparent. This may be accomplished by, for example, forming the bottom support 424 or a portion thereof from a material that is at least semi-transparent. Alternatively, holes or slots may be provided in the bottom support 424 to allow the light to pass through the bottom support 424. In some embodiments, the holes or slots may be spaced holes or slots that are spaced along the length of the bottom support 424. Such spaced holes or slots may be formed by, for example, periodically interrupting the extrusion material along the bottom support 424. Other methods may also be used, such as cutting, drilling or otherwise forming spaced holes or slots. Spaced holes or slots may be used in other embodiments described herein, if desired.

In some embodiments, the back support 420, top support 422 and bottom support 424 may be formed from a transparent or semi-transparent material. In other embodiments, only selected portions may be formed from a transparent or semi-transparent material. For example, the bottom support 424, or portion thereof, may be formed from a transparent or semi-transparent material. In this latter case, the back support 420, top support 422 and bottom support 424 may be co-extruded using a non-transparent and transparent or semi-transparent material, with the transparent or semi-transparent material corresponding to the portion that is to transmit light. Alternatively, the bottom support 424, or the portion thereof that is to pass light, may be separately formed and subsequently attached, if desired.

In another illustrative embodiment, the inner support member 436 or a portion thereof may be made from a transparent or semi-transparent material to pass light toward the bumper member 414. In this illustrative embodiment, the bumper member 414, or a portion thereof, may also be formed from a transparent or semi-transparent material. When so provided, the light from the light source 416 may pass through the inner support member 436, through the bumper member 414, and away from the carrier 412. In use, the back support 420 is preferably positioned adjacent a mounting surface and mounted thereto.

It is contemplated that the bumper member 414 and/or carrier 412, or parts thereof, may be made using materials of different colors, as desired. Also, it is contemplated that the light source may be selected to produce a desired color of light.

Figure 19:
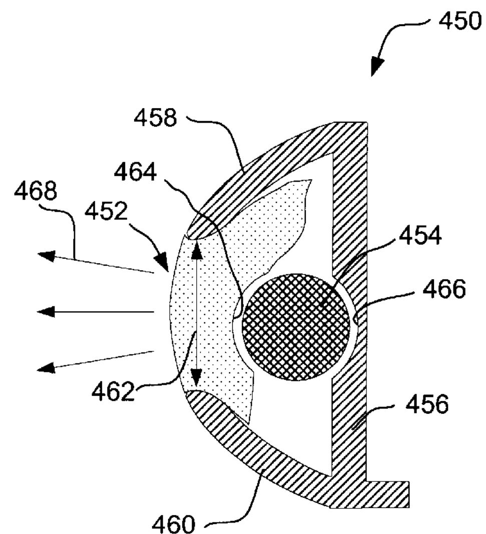
FIG. 19 is a cross-sectional side view of an illustrative lighting apparatus that includes a bumper member, wherein at least a portion of the bumper member is adapted to transmit light.

FIG. 19 is a cross-sectional side view of another illustrative lighting apparatus of the present invention. The illustrative lighting apparatus includes a carrier 450, a bumper member 452, and an elongated light source 454. The carrier 450 includes a back support 456, a top support 458 and a bottom support 460, as shown. The top support 458 and bottom support 460 are shown extending from the top and bottom ends, respectively, of the back support 456 in a leftward direction. The top support 458 and bottom support 460 terminate to define a gap or slot 462 therebetween.

The bumper member 452 is shown positioned in the gap or slot 462, as described above. In the illustrative embodiment, the back surface 464 of the bumper member 452 and the front surface 466 of the back support 456 are shaped to form a light receiving channel, opening or cavity. In the illustrative embodiment, the light receiving channel, opening or cavity is adapted to receive and secure an elongated light source 454. It is contemplated that the elongated light source 454 may be any type of light source, including those identified herein.

The bumper member 452, or a portion thereof, is preferably formed from a transparent or semi-transparent material. When so provided, the light from the light source 454 may pass through the bumper member 452, and away from the carrier 450 as shown by lines 468.

Figure 20:
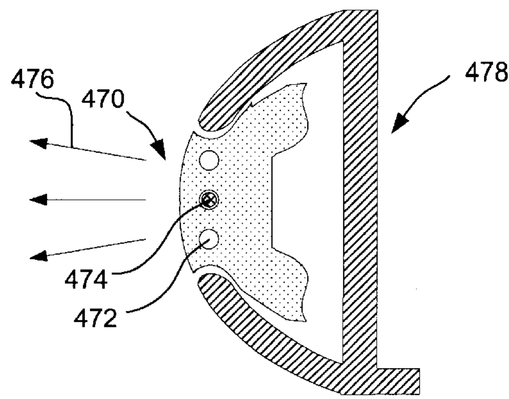
FIG. 20 is a cross-sectional side view of another illustrative lighting apparatus that includes a bumper member, wherein the bumper member is adapted to receive a light source and transmit light.

FIG. 20 is a cross-sectional side view of another illustrative lighting apparatus in accordance with the present invention. In this illustrative embodiment, the bumper member 470 includes one or more holes, slots or lumens 472. A light source 474 is then positioned in one or more of the holes, slots or lumens 472. Only one light source 474 is shown in FIG. 20. The bumper member 470, or a portion thereof, is preferably formed from a transparent or semi-transparent material. When so provided, the light from the light source 474 may pass through the transparent or semi-transparent portion of the bumper member 470 and away from the carrier 478, as shown by lines 476.

When more than one light source 474 is provided, each light source 474 may be situated in a different one of the holes or lumens 472, but this is not required. Selected light sources may be selected to produce different colors. Alternatively, or in addition, the portion of the bumper member 470 adjacent selected light sources may be formed from materials of different colors. In some embodiments, this may provide the appearance of one or more stripes of colors along the bumper member 470.

Figure 21:
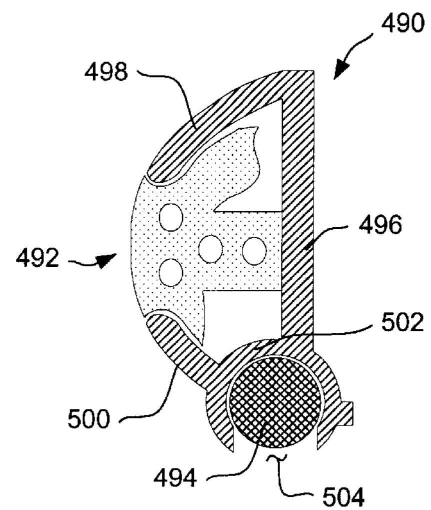
FIG. 21 is a cross-sectional side view of an illustrative lighting apparatus that includes a carrier and a bumper member, wherein the carrier is adapted to receive a light source.

FIG. 21 is a cross-sectional side view of another illustrative lighting apparatus in accordance with the present invention. In this illustrative embodiment, the lighting apparatus includes a carrier 490, a bumper member 492, and a light source 494. The carrier 490 includes a back support 496, a top support 498 and a bottom support 500, as shown. Like above, the top support 498 and bottom support 500 terminate to define a gap or slot for receiving the bumper member 492.

In the illustrative embodiment, the back support 496 and the bottom support 500 are joined together through a light carrying member 502. Although not shown in FIG. 21, it is contemplated that the back support 496 and the top support 498 may also be joined together through another light carrying member, if desired, to provide light in an upward direction. The light carrying member 502 preferably defines a channel, cavity or recess for receiving the light source 494. Preferably, the cavity or recess is sized to receive the light source and secure the light source 494 to the carrier 490. In the illustrative embodiment, the cavity or recess has a receiving slot 504 for receiving the light source 494. In a preferred embodiment, the light source 494 is an elongated light source such as an electroluminescent wire or a Linear Emitting Fiber, as detailed above. However, it is contemplated that the light source 494 may be any type of light source, including those identified herein.

Figures 22, 23, 24:
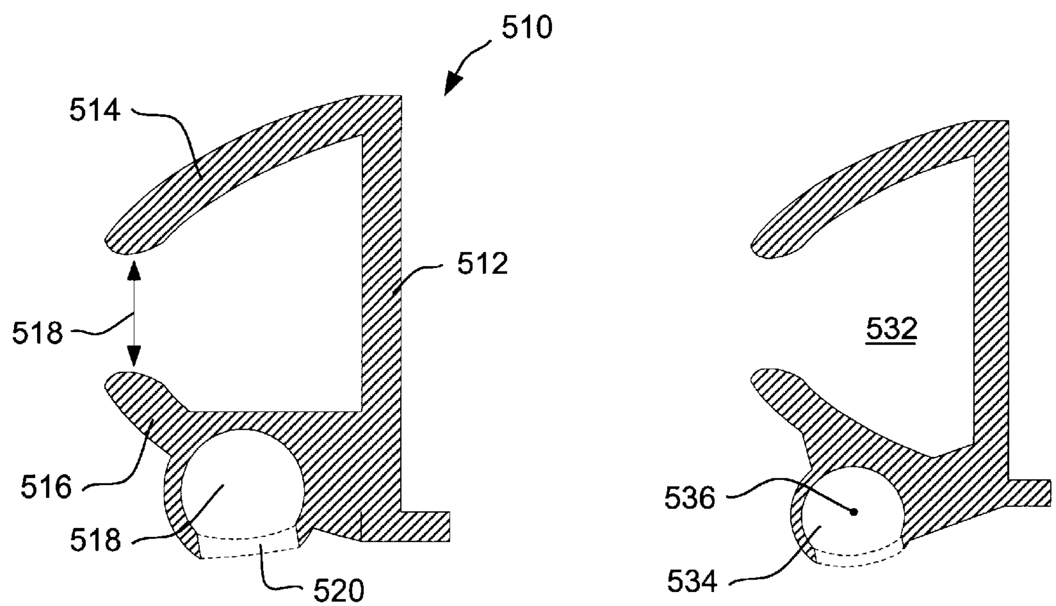
FIG. 22 is a cross-sectional side view of another illustrative lighting apparatus that includes a carrier that is adapted to receive a light source.
FIG. 23 is a cross-sectional side view of yet another illustrative lighting apparatus that includes a carrier that is adapted to receive a light source.
FIG. 24 is a cross-sectional side view of an illustrative Fresnel lens that may be used in accordance various embodiments of the present invention.

FIG. 22 is a cross-sectional side view of yet another illustrative lighting apparatus in accordance with the present invention. In this illustrative embodiment, the lighting apparatus includes a carrier 510. For simplicity, the bumper member and light source are not shown. The carrier 510 includes a back support 512, a top support 514 and a bottom support 516, as shown. Like above, the top support 514 and bottom support 516 terminate to define a gap or slot 518 for receiving a bumper member.

In the illustrative embodiment, the bottom support 516 is shaped to provide a light carrying channel, cavity or recess 518. The light carrying channel, cavity or recess 518 preferably is sized to receive a light source. In the illustrative embodiment, the channel, cavity or recess 518 preferably has a transparent or semi-transparent portion 520 for passing light in a downward direction. The transparent or semi-transparent portion 520 may be co-extruded with the rest of the carrier 510, which may be made from a non-transparent material, if desired. Alternatively, the transparent or semi-transparent portion 520 may be formed separately, and subsequently secured to the bottom support 516.

In either case, and in some embodiments, the transparent or semi-transparent portion 520 may be shaped to form a Fresnel lens, as shown in FIG. 24. A Fresnel lens may help collect and focus the light that is emitted by the light source. A Fresnel lens may also help minimize the amount of absorption in the lens by reducing the thickness of the lens. Other lens shapes may also be used.

FIG. 23 is a cross-sectional side view of yet another illustrative lighting apparatus in accordance with the present invention. This illustrative embodiment is similar to the embodiment shown in FIG. 22. However, the bottom support 530 is shaped to provide a larger cavity 532 for receiving a bumper member. Further, the wall thickness of the bottom support 530 is maintained along its length. In the illustrative embodiment, this is accomplished by moving the central axis 536 of the light carrying cavity or recess 534 further down and/or away from the carrier.

Figure 25:
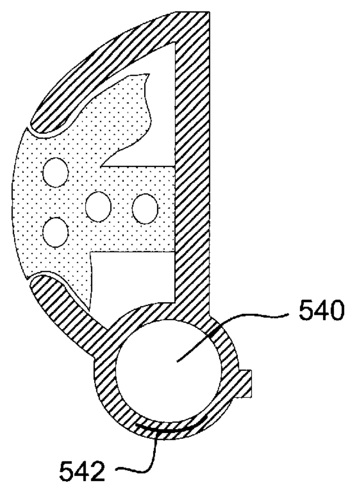
FIG. 25 is a cross-sectional side view of another illustrative lighting apparatus that includes a carrier that is adapted to receive a light source.

FIG. 25 is a cross-sectional side view of another illustrative lighting apparatus in accordance with the present invention. This illustrative embodiment is similar to the embodiment shown in FIG. 21. However, the cavity or recess 540 does not have a receiving slot for receiving the light source 494. Instead, a wall encircles the cavity or recess 540. In one embodiment, a lower portion 542 of the wall encircling the cavity or recess 540 is formed from a transparent or semi-transparent material. The remainder of the wall encircling the cavity or recess 540 may be at least partially reflective, but this is not required.

Figure 26:
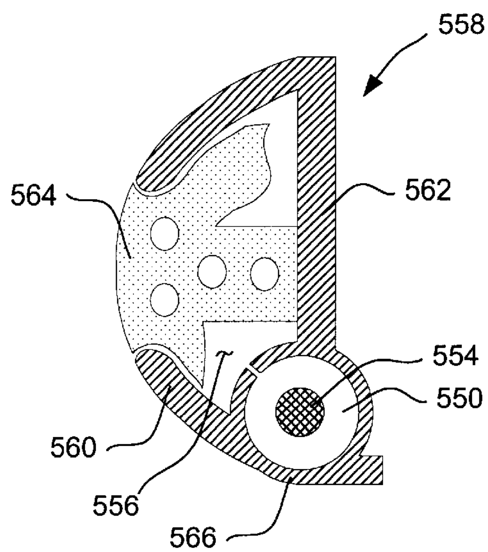
FIG. 26 is a cross-sectional side view of another illustrative lighting apparatus that includes a carrier that is adapted to receive a light source.

FIG. 26 is a cross-sectional side view of another illustrative lighting apparatus in accordance with the present invention. This illustrative embodiment is similar to that shown in FIG. 25. However, the cavity or recess 550 has a receiving slot 552 for receiving a light source 554. The receiving slot 552 is shown opening into the inner cavity 556 of the carrier 558. To install the light source 554 into the cavity or recess 550, the bottom support 560 may be pulled away from the back support 562. Preferably, the bottom support 560 and/or back support 562 temporarily elastically deform to open the receiving slot 552 and receive the light source 554. Once the light source 554 is in the cavity or recess 550, the bottom support 560 may be returned or nearly returned to its original position relative to the back support 562. The bumper member 564 is then installed, also preferably by elastic deformation of the bumper member 564 and/or carrier 558. Like the embodiment shown in FIG. 25, it is contemplated that a lower portion 566 of the wall encircling the cavity or recess 550 may be formed from a transparent or semi-transparent material. The remainder of the wall encircling the cavity or recess 550 may be at least partially reflective, but this is not required.

Figure 27:
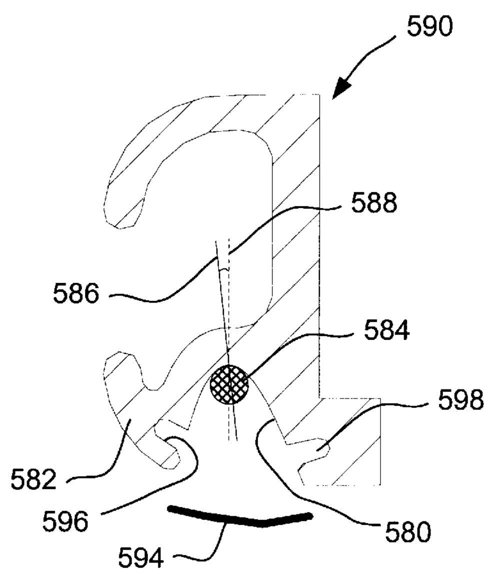
FIG. 27 is a cross-sectional side view of another illustrative lighting apparatus that includes a carrier, wherein the carrier includes a parabolic shaped recess for receiving a light source.

FIG. 27 is a cross-sectional side view of yet another illustrative lighting apparatus in accordance with the present invention. In this illustrative embodiment, a parabolic shaped recess or cavity 580 is formed in the bottom support 582. A parabolic shape may help collect and direct the light emitted by the light source 584 in a particular direction, particular if the walls of the parabolic shaped recess or cavity 580 are at least partially reflective. In some embodiments, the axis 586 of the parabolic shaped recess or cavity 580 may be offset relative to a vertical axis 588 to help direct the light rays toward an object, such as an object that the carrier 590 is mounted.

A lens or cover 594 may be provided to cover the parabolic shaped recess or cavity 580, if desired. In some illustrative embodiments, one or more receiving slots 596 and 598 may be provided for receiving the edges of the lens or cover 594. In other illustrative embodiments, the lens or cover may be co-extruded or otherwise integrally formed or securely attached to the carrier 590.

Figure 28:
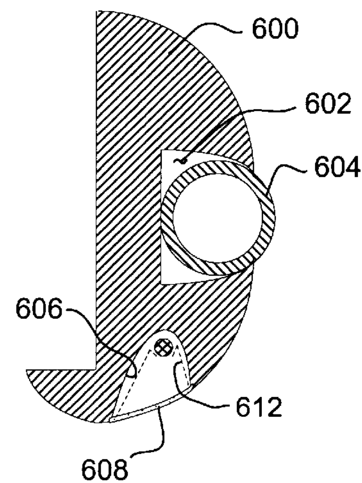
FIG. 28 is a cross-sectional side view of another illustrative lighting apparatus that includes a carrier and a bumper member, wherein the carrier includes a recess for receiving a light source.

FIG. 28 is a cross-sectional side view of another illustrative lighting apparatus in accordance with the present invention. This illustrative embodiment includes a "D" shaped carrier 600 having a bumper receiving slot 602. A bumper member 604 may be provided in the bumper receiving slot 602. The bumper member 604 may be an elongated tube that is sized to fit within the bumper receiving slot 602, as shown. Like the illustrative embodiment of FIG. 27, a parabolic shaped recess or cavity 606 is provided in a bottom portion of the "D" shaped carrier 600. A lens or cover 608 may be provided to cover the parabolic shaped recess or cavity 606, if desired. In the illustrative embodiment, the lens or cover is co-extruded or otherwise integrally formed or securely attached to the "D" shaped carrier 600, but this is not required.

A light source 610 is shown positioned in the parabolic shaped recess or cavity 606. One or more light source support members 612 may be provided to help secure the light source 610 in the parabolic shaped recess or cavity 606. In some embodiments, the one or more light source support members 612 may help secure the light source 610 at or near the focal point of the parabolic shaped recess or cavity 606.

Figure 29:
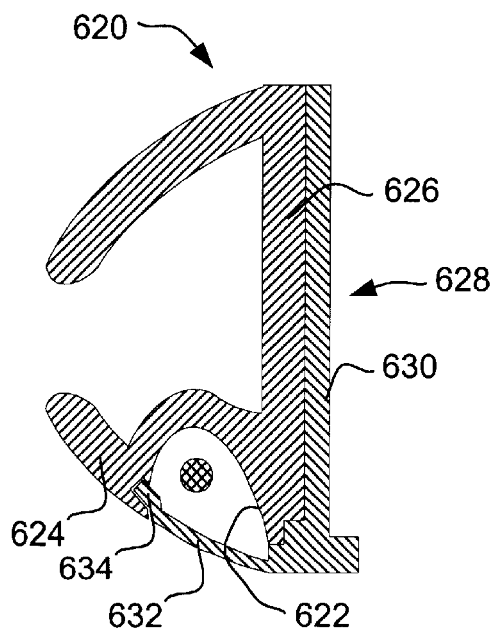
FIG. 29 is a cross-sectional side view of another illustrative lighting apparatus that includes a two piece carrier, wherein the first piece includes a recess for receiving a light source and the second piece provides a cover for the recess.

FIG. 29 is a cross-sectional side view of yet another illustrative lighting apparatus in accordance with the present invention. In this illustrative embodiment, a carrier 620 is provided with a light receiving channel, cavity or recess 622 formed in the bottom support 624. A light source 634 is positioned within the light receiving channel, cavity or recess 622. The illustrative carrier 620 has a back support 626 that is adapted to be adjacent a mounting surface.

A mating member 628 is also provided. The mating member 628 may include a back support 630 and a lens or cover portion 632. The mating member 628 preferably mates with the back support 626 of the carrier 620. The lens or cover portion 632, or a portion thereof, preferably is shaped to cover the light receiving cavity or recess 622 formed in the bottom support 624. A slot may be provided in the bottom support 624 of the carrier 620 to receive a lip 634 of the lens or cover portion 632, if desired.

In one illustrative embodiment, the carrier 620 may be made from a material that is non-transparent and at least partially reflective. The mating member 628 may be made from a material that is at least semi-transparent. Alternatively, only the lens or cover portion 632 of the mating member 628 may be made from a material that is at least semi-transparent. In other embodiments, the carrier 620 may be made from a material that is at least partially transparent, and the mating member may be made from a material that is non-transparent and at least partially reflective. In any case, it is contemplated that the mating member 628 may be made separate from the carrier 620.

Figure 30:
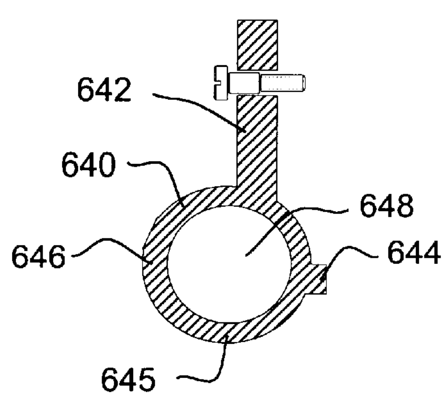
FIG. 30 is a cross-sectional side view of another illustrative lighting apparatus in accordance with the present invention.

FIG. 30 is a cross-sectional side view of another illustrative lighting apparatus in accordance with the present invention. In this illustrative embodiment, no separate bumper member is provided. Instead, an elongated tube 640 is provided with a mounting support 642 extending therefrom. A spacer support 644 may also be provided to help space the tube 640 from the mounting surface. A light source (not shown) can be positioned within the inner lumen 648 of the tube 640, as desired. At least a portion of the tube 640 is preferably at least semi-transparent to allow at least some of the light rays from the light source to exit from the tube 640. In one embodiment, portion 645, portion 646, or both, are at least semi-transparent. In some embodiments, the tube 640 is adapted to prevent light rays from traveling in a first direction away from the tube 640 while allowing light rays to travel in a second different direction away from the tube 640.

Figure 31:
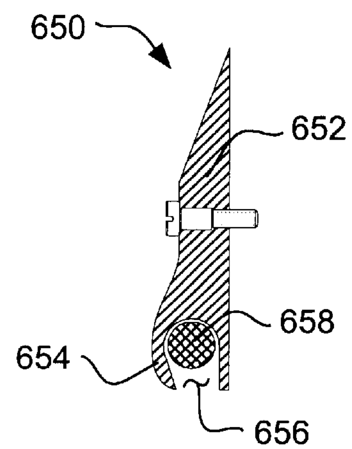
FIG. 31 is a cross-sectional side view of yet another illustrative lighting apparatus in accordance with the present invention.

FIG. 31 is a cross-sectional side view of yet another illustrative lighting apparatus in accordance with the present invention. Like the embodiment shown in FIG. 30, this illustrative embodiment also does not have a separate bumper member. Instead, an elongated member 650 is provided with a mounting region 652 and a light source receiving region 654. The light source receiving region 654 includes a light source receiving cavity or recess 656, which receives a light source 658. The elongated member 650 may be made from a non-transparent or at least semi-transparent material, as desired.

Figure 32:
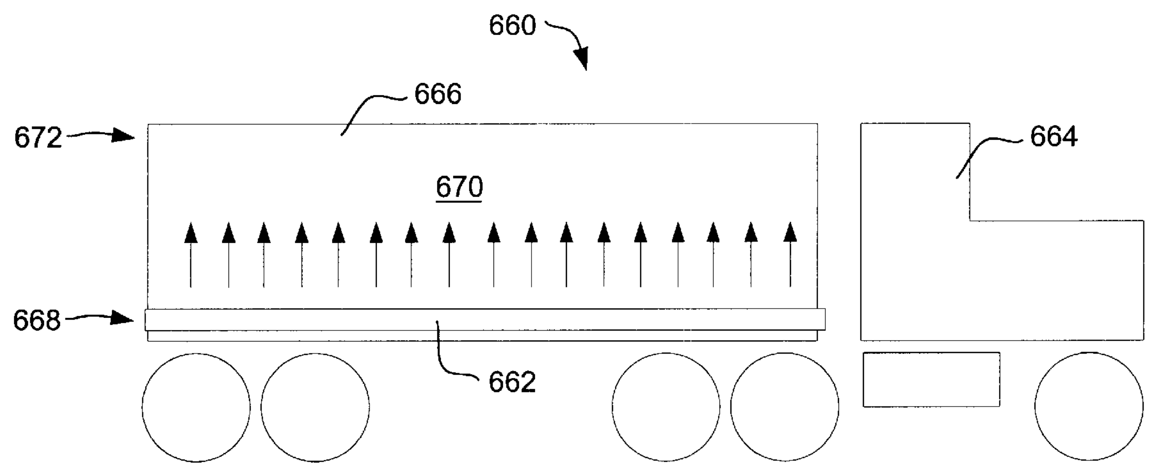
FIG. 32 is a schematic view of a truck with an illustrative lighting apparatus mounted to the side thereof.

As indicated above, it is contemplated that some embodiments of the present invention may be used to illuminate vehicles, such as boats (including barges), cars, trucks, etc., preferably by illuminating one or more side surfaces of the vehicle. The side surfaces of many vehicles provide a relatively large area that, when illuminated, can significantly increase the visibility of the vehicle, especially at night. It is believed that by providing such visibility, vehicle safety can be significantly improved. FIG. 32 is a schematic view of a truck 660 with an illustrative lighting apparatus 662 mounted to the side thereof. The illustrative truck 660 includes a cab 664 and a trailer 666, with an illustrative lighting apparatus 662 mounted along a lower edge 668 of the trailer 666. The illustrative lighting apparatus 662 may be similar to those described herein, and may distribute light in an upward direction to illuminate at least a portion of the side surface 670 of the trailer 666. The lighting apparatus 662 may extend around the perimeter of the trailer 666, if desired.

In some embodiments, the illustrative lighting apparatus 662 may include a bumper, to help provide a level of protection to the lower edge 668 of the trailer 666. Such protection may be desirable when, for example, the truck 660 is maneuvering into a loading dock or the like. While the illustrative lighting apparatus is shown mounted to a truck trailer 666, it may also be mounted to the box of a straight truck, or even to the cab 664, as desired. In addition, it is contemplated that the illustrative lighting apparatus 662 may be mounted to an upper edge 672 of the cab 664 or trailer 666, and/or at an intermediate location, as desired.

Figure 33:
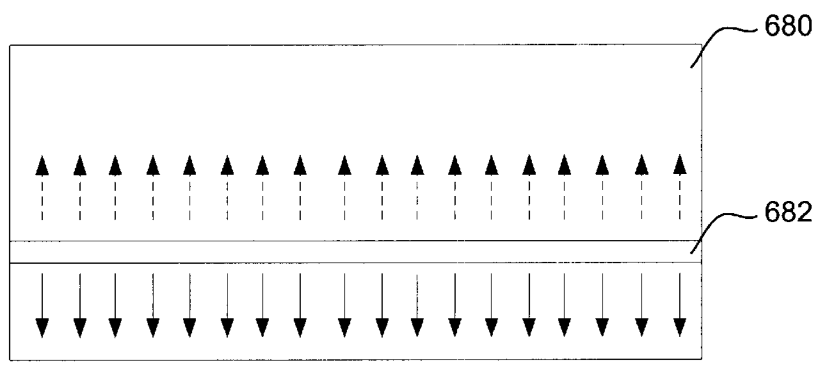
FIG. 33 is a schematic view of an object that has an illustrative lighting apparatus mounted to the side thereof.

FIG. 33 is a schematic view of an object, generally shown at 680, with an illustrative lighting apparatus 682 mounted to the side thereof. The object 680 may by any type of object. For example, the object 680 may include retail and/or store shelving and/or equipment (including grocery store shelving and/or equipment such as refrigerated shelving), bars, desks, counters, walls such as in hallways or rooms, railings, steps, and/or any other object or surface, as desired. The illustrative lighting apparatus 682 is shown providing illumination in both an upward and downward direction, although in some embodiments, illumination may be only provided in one direction. In some embodiments, the lighting apparatus 682 may include a bumper, such as described above. When so provided, the lighting apparatus 682 may help provide a level of protection to the object 680.

Figure 34:
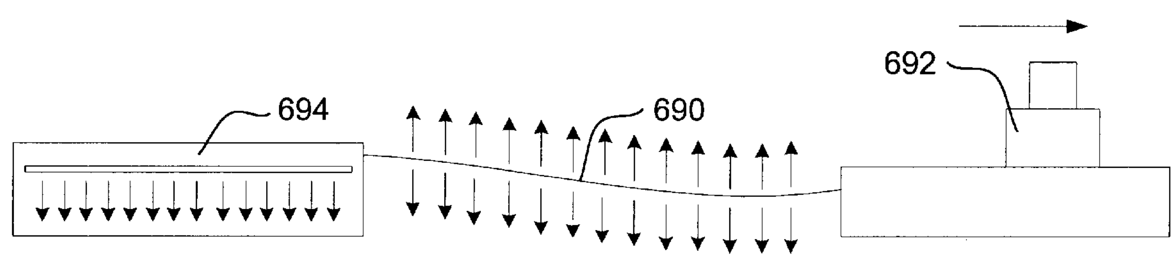
FIG. 34 is a schematic view of a tow line that includes an illustrative lighting apparatus in accordance with the present invention.

FIG. 34 is a schematic view of a tow line 690 that includes an illustrative lighting apparatus in accordance with the present invention. A tug or other boat 692 is shown pulling one or more barges 694 via tow line 690. It is contemplated that the tug boat 692, tow line 690 and/or one or more barges 694 may be illuminated using a lighting apparatus in accordance with the present invention. The tow line 690 may be illuminated by securing one or more light sources to the tow line 690. For example, an electroluminescent wire or Linear Emitting Fiber may be secured along the length of the tow line. Other types of the light sources may also be used. This may allow other boaters to more easily see the tug boat 692, tow line 690 and/or barges 694 at night.

It is also contemplated that one or more light sources may be provided on parked barges 694 to illuminate one or more sides surfaces of the barges 694. The one or more light sources may be incorporated into a lighting apparatus, as described herein. Barges are often fairly dark in color, and can be difficult to see at night. By illuminating one or more side surfaces of the barges 694, boaters may more easily see the parked barges at night.

Having thus described the preferred embodiments of the present invention, those of skill in the art will readily appreciate that the teachings found herein may be applied to yet other embodiments within the scope of the claims hereto attached.

What is claimed is:

1. An elongated bumper assembly, comprising:

one or more light source;

an elongated deformable bumper member;

an elongated carrier, the elongated carrier including:

a slot or opening for receiving the elongated deformable bumper member, the slot or opening and the elongated deformable bumper member being adapted so that the elongated deformable bumper member and/or the elongated carrier must be elastically deformed for the elongated bumper member to slip into the slot or opening; and means for receiving the one or more light source, wherein said means for receiving the one or more light source includes a channel, opening or cavity defined at least in part by a wall, wherein the at least part of the wall of the channel, opening or cavity is at least semi-transparent and at least part of the wall of the channel, opening or cavity is substantially non-transparent, and the at least semi-transparent part of the wall is formed separately from the substantially non-transparent part and mechanically coupled thereto.

2. An elongated bumper assembly according to claim 1 wherein said wall helps retain the one or more light source relative to the elongated bumper assembly.

3. An elongated bumper assembly according to claim 1 wherein at least part of the wall must be elastically deformed to receive the one or more light source.

4. An elongated bumper assembly according to claim 1 wherein at least part of the at least semi-transparent portion of the wall is shaped to form a Fresnel lens.

5. An elongated light assembly according to claim 1 wherein the one or more light source is an electroluminescent wire.

6. An elongated light assembly according to claim 1 wherein the one or more light source is a Linear Emitting Fiber.

7. An elongated bumper assembly according to claim 1 wherein the elongated bumper assembly is secured to a boat.

8. An elongated bumper assembly according to claim 1 wherein the elongated bumper assembly is secured to a vehicle.

9. An elongated bumper assembly according to claim 1 wherein the elongated bumper assembly is secured to a shelf.

10. An elongated bumper assembly according to claim 1 wherein the elongated bumper assembly is secured to a counter.

11. An elongated bumper assembly according to claim 1 wherein the elongated bumper assembly is secured to a wall.

12. An elongated bumper assembly according to claim 1 wherein at least part of the wall is at least partially reflective.

13. An elongated bumper assembly according to claim 12 wherein at least part of the at least partially reflective portion of the wall is parabolic in shape.

14. An elongated light assembly, comprising:

an elongated and continuous light source for emitting a number of light rays; and an elongated bumper member, the elongated bumper member adapted to at least partially retain the elongated light source relative to the elongated light assembly, at least part of the elongated bumper member being at least semi-transparent so that at least some of the light rays emitted by the elongated light source pass through the at least semi-transparent part of the elongated bumper member, and at least part of the elongated bumper member being substantially non-transparent, wherein the at least semi-transparent portion of the elongated bumper member is formed separately from the substantially non-transparent portion and mechanically coupled thereto.

15. An elongated light assembly according to claim 14 wherein the elongated bumper member has a channel, cavity or slot for receiving the elongated light source and to at least partially retain the elongated light source relative to the elongated light assembly, at least part of the channel, cavity or slot defined at least in part the at least semi-transparent part.

16. An elongated light assembly according to claim 14 wherein the elongated light source includes an electroluminescent wire.

17. An elongated light assembly according to claim 14 wherein the elongated light source includes a Linear Emitting Fiber.

18. An elongated light assembly according to claim 14 wherein the elongated light assembly is secured to a boat.

19. An elongated light assembly according to claim 14 wherein the elongated light assembly is secured to a vehicle.

20. An elongated light assembly according to claim 14 wherein the elongated light assembly is secured to a shelf.

21. An elongated light assembly according to claim 14 wherein the elongated light assembly is secured to a counter.

22. An elongated light assembly according to claim 14 wherein the elongated light assembly is secured to a wall.

23. An elongated light assembly according to claim 14 wherein the elongated bumper member is adapted to prevent light rays from traveling in a first direction away from the elongated light assembly while allowing light rays to travel in a second different direction away from the elongated light assembly.

24. An elongated light assembly according to claim 23 wherein the elongated light source includes an electroluminescent wire.

25. An elongated light assembly according to claim 23 wherein the elongated light source includes a Linear Emitting Fiber.

26. An elongated light assembly that can be mounted on a mounting surface, comprising:

one or more light source;

a first piece having a recess formed therein for receiving the one or more light source, the first piece having a back side that is adapted to be adjacent the mounting surface, the recess in a side other than the back side of the first piece; and a second piece having a first portion and a second portion, the first portion being adapted to be positioned between the back side of the first piece and the mounting surface, and the second portion being adapted to cover at least part of the recess in the first piece, at least part of the second portion being at least partially transparent.

27. An elongated light assembly according to claim 26 further comprising an elongated bumper member mechanically coupled to the first piece.

28. A method for making an elongated member for a light assembly, the method comprising the steps of:

co-extruding an elongated member that is adapted to receive a light source using a first material and a second material, wherein the first material is at least semi-transparent and the second material is substantially non-transparent.

29. A method according to claim 28 wherein the elongated member is extruded to include a cavity for receiving the light source, the cavity defined by one or more walls, wherein at least a portion of the one or more walls is extruded using the first material.

30. A light, comprising:

an elongated electroluminescent light source, the elongated electroluminescent light source including an electroluminescent material and one or more conductors extending along the length of the electroluminescent light source, the one or more conductors adapted to carry an alternating current that excites the electroluminescent material to produce light;

a polymer sleeve situated around the circumference of the elongated electroluminescent light source, the polymer sleeve having a UV absorber for absorbing ultra-violet light.

31. A light according to claim 30 wherein the UV absorber operates using photoreactive chemistry.

* * * * *